(12) United States Patent
Zhan et al.

(10) Patent No.: US 12,304,585 B2
(45) Date of Patent: May 20, 2025

(54) VEHICLE AND CENTRALIZE CONTROL SYSTEM THEREOF

(71) Applicant: Zhejiang CFMOTO Power Co., Ltd., Zhejiang (CN)

(72) Inventors: Daoyong Zhan, Hangzhou (CN); Zhiyong Chen, Hangzhou (CN); Yong Wu, Hangzhou (CN); Jinjiang Liu, Hangzhou (CN); Tao Pan, Hangzhou (CN); Maolin Wei, Hangzhou (CN); Mailin Feng, Hangzhou (CN); Bingbing Yang, Hangzhou (CN); Xu Guo, Hangzhou (CN)

(73) Assignee: Zhejiang CFMoto Power Co. Ltd., Hangzhou (CN)

( * ) Notice: Subject to any disclaimer, the term of this patent is extended or adjusted under 35 U.S.C. 154(b) by 0 days.

(21) Appl. No.: 18/367,879

(22) Filed: Sep. 13, 2023

(65) Prior Publication Data

US 2024/0002007 A1 Jan. 4, 2024

Related U.S. Application Data

(63) Continuation of application No. PCT/CN2021/113025, filed on Aug. 17, 2021.

(51) Int. Cl.
*G06F 5/14* (2006.01)
*B62J 45/41* (2020.01)
(Continued)

(52) U.S. Cl.
CPC ............ *B62J 50/22* (2020.02); *B62J 45/41* (2020.02); *B62J 45/42* (2020.02); *G06F 3/0416* (2013.01);
(Continued)

(58) Field of Classification Search
CPC .. G09G 5/14; G09G 2354/00; G09G 2380/10; G06F 3/147; B62J 45/20; G62K 23/02; G62J 50/22
See application file for complete search history.

(56) References Cited

U.S. PATENT DOCUMENTS 6,157,297 A * 12/2000 Nakai ................ G01C 21/3652
340/995.26
6,588,297 B1 * 7/2003 Day ....................... B62K 21/12
340/432
(Continued)

FOREIGN PATENT DOCUMENTS

CN 105730235 A 7/2016
CN 108107785 A 6/2018
(Continued)

*Primary Examiner* — Olga V Merkoulova
(74) *Attorney, Agent, or Firm* — Shewchuk IP Services, LLC; Jeffrey D. Shewchuk

(57) ABSTRACT

A centralized control system of a vehicle includes a control unit and a display screen. The control unit is capable of controlling the display screen to display instrument images and entertainment images in at least two different and switchable display modes based on at least two operating systems. In a first (instrument-focused) display mode, the instrument images and the entertainment images displayed on the display screen are both generated under control of the first operating system and an area occupied by the instrument images on the display screen is greater than an area occupied by the entertainment images on the display screen. In a second (entertainment-focused) display mode, an area occupied by the instrument images on the display screen is less than or equal to an area occupied by the entertainment images on the display screen, with at least some of the entertainment images generated by the second operating system.

20 Claims, 9 Drawing Sheets

(51) Int. Cl.
  *B62J 45/42* (2020.01)
  *B62J 50/22* (2020.01)
  *G06F 3/041* (2006.01)
  *G09G 5/14* (2006.01)
  *H04N 7/18* (2006.01)

(52) U.S. Cl.
  CPC ............... *G09G 5/14* (2013.01); *H04N 7/183* (2013.01); *G09G 2354/00* (2013.01); *G09G 2380/10* (2013.01)

(56) References Cited

U.S. PATENT DOCUMENTS

| | | | | |
|---|---|---|---|---|
| 6,987,446 | B2* | 1/2006 | Konno | B60R 25/24 |
| | | | | 340/432 |
| 7,044,814 | B2* | 5/2006 | Kamio | F02D 41/3005 |
| | | | | 701/115 |
| 10,860,208 | B2 | 12/2020 | Narayan et al. | |
| 10,885,728 | B1 | 1/2021 | Havins | |
| 10,891,921 | B2 | 1/2021 | Mittal et al. | |
| 11,531,333 | B2* | 12/2022 | Peizner | G06F 16/2358 |
| 2002/0020249 | A1* | 2/2002 | Darland | B62K 23/06 |
| | | | | 74/551.8 |
| 2004/0048598 | A1* | 3/2004 | Gagnon | G08G 1/205 |
| | | | | 455/427 |
| 2013/0167159 | A1 | 6/2013 | Ricci et al. | |
| 2016/0328254 | A1* | 11/2016 | Ahmed | G06F 9/45545 |
| 2018/0208060 | A1* | 7/2018 | Kim | B60K 35/00 |
| 2018/0326850 | A1 | 11/2018 | Recktenwald et al. | |
| 2019/0075203 | A1* | 3/2019 | Suzuki | G08G 1/144 |
| 2019/0251840 | A1* | 8/2019 | Kukimoto | B60K 35/29 |
| 2019/0265064 | A1* | 8/2019 | Koenig | G07C 5/008 |
| 2020/0273268 | A1* | 8/2020 | Bhattacharyya | ............................ |
| | | | | G06Q 10/06315 |
| 2023/0102579 | A1 | 3/2023 | Liu et al. | |

FOREIGN PATENT DOCUMENTS

| | | | | |
|---|---|---|---|---|
| CN | 110722985 | A | 1/2020 | |
| CN | 110979009 | A | 4/2020 | |
| CN | 305819978 | S | 6/2020 | |
| DE | 102016124407 | A1* | 6/2018 | ............. B60K 35/00 |
| WO | WO-2018109094 | A1* | 6/2018 | ............. B60K 35/00 |

* cited by examiner

VEHICLE AND CENTRALIZE CONTROL SYSTEM THEREOF

RELATED APPLICATION INFORMATION

The present application is a continuation of PCT/CN2021/113025 filed on Aug. 17, 2021, which claims the benefits of priority to Chinese Patent Application No. 202110743756.5, filed with the Chinese Patent Office on Jun. 30, 2021. The entire contents of the above-referenced applications are incorporated herein by reference.

FIELD OF THE DISCLOSURE

The present invention relates to the field of motor vehicles, and in particular to motorcycles, off-road vehicles and similar limited space vehicles with centralized control systems.

BACKGROUND OF THE DISCLOSURE

Traditional motorcycles generally only provide instrument information through a dashboard. However, motorcycles are becoming increasingly intelligent with the increasing demand for intelligent entertainment functions (such as multi-media and navigation).

Centralized control systems equipped with entertainment functions are increasingly appearing in various cars. Compared to traditional cars, cars equipped with entertainment functions generally integrate a centralized control display screen in the area between the driver seat and the passenger seat. This is generally easier to implement in cars because the cockpit space of the car is large, making it easier to arrange the instrument dashboard and centralized control display screen at the same time. However, this is relatively difficult to implement on motorcycles due to the small front space and low cost of the motorcycle.

Presently, existing motorcycles that support intelligent functions generally adopt a solution where the instrument function and entertainment function are independent of each other. In other words, two different display screens are needed to achieve instrument display functions and entertainment display functions and two independent control units are needed to control the two display screens to achieve display control and function support. It is difficult to arrange the instrument screen for showing instrument information and the entertainment screen for entertainment applications due to the limited space in the front area of the motorcycle, and the instrument screen and the entertainment screen are too small, which is not conducive to users viewing relevant information.

There is currently no effective solution proposed on how to meet the intelligent entertainment function requirements of motorcycles and provide a more suitable centralized control system.

SUMMARY OF THE INVENTION

The present invention provides a vehicle and a centralized control system to solve at least one problem above.

The preferred embodiment provides a vehicle, which may be a motorcycle or an off-road vehicle. The vehicle includes a frame, a plurality of wheels, a suspension system, a power system, at least one seat and a manipulation system. The plurality of wheels include at least one front wheel and at least one rear wheel. The suspension system includes a front suspension and a rear suspension. The at least one front wheel is connected to the frame through the front suspension, and the at least one rear wheel is connected to the frame through the rear suspension. The power system is disposed on the frame for providing power to the vehicle, and at least one of the front wheel and the rear wheel is connected to the power system. At least one seat is disposed on the frame. The manipulation system is used to manipulate the running of the vehicle. The vehicle further includes a centralized control system which includes a control unit and a display screen. The display screen is disposed adjacent to the manipulation system and in front of the at least one seat. At least two operating systems are running in the control unit; and the at least two operating systems comprise a first operating system and a second operating system. The control unit is capable of controlling the display screen to display one or a plurality of instrument images and one or a plurality of entertainment images in at least two different and switchable display modes based on at least two operating systems. The at least two different and switchable display modes comprise a first display mode and a second display mode. The first display mode involves instrument images which occupy an area on the display screen which is greater than an area occupied by the entertainment images on the display screen. The second display mode involves instrument images which occupy an area on the display screen which is less than or equal to an area occupied by the entertainment images on the display screen.

In one aspect, in the first display mode, the instrument images and the entertainment images displayed on the display screen are both generated under control of the first operating system. In the second display mode, at least some of the instrument images and at least some of the entertainment images are generated under control of the first operating system and at least another some of the entertainment images are generated under control of the second operating system.

In a second aspect, the at least one seat comprising at least one driver seat. The display screen showing the at least two different and switchable display modes is in front of the driver seat.

In a third aspect, the instrument images are at least used to show vehicle driving information and vehicle status information. The entertainment images are at least used to show one or a plurality of running entertainment applications and/or one or a plurality of entertainment applications supported to be run. All of the images displayed on the display screen in the first (instrument-focused) display mode are generated under control of the first operating system. In the second display mode, at least some of the instrument images and at least some of the entertainment images are generated under control of the first operating system and at least another some of the instrument images and at least another some of the entertainment images are generated under control of the second operating system.

In another aspect, the display screen is disposed adjacent to the manipulation system and in front of the at least one seat.

In this way, the shortcomings of a single display screen on existing motorcycles that can only display limited functions and have limited display area have been overcome. The display function of the display screen has been expanded, and the display area of instrument display and entertainment display has been expanded. By providing users with at least two different display modes, switching and adjusting the displayed images in different display modes is achieved, which is beneficial for users to view relevant information.

The details of one or more embodiments are presented in the following drawings and descriptions to make the other features, objectives, and advantages of the present invention more concise and understandable.

BRIEF DESCRIPTION OF THE DRAWINGS

The accompanying drawings described here are intended to provide a further understanding of the present invention. The illustrative embodiments and explanations of the detailed description are used to explain the present invention and do not constitute an improper limitation of the invention.

DETAILED DESCRIPTION

For a better understanding of the purpose, technical solutions and advantages of the present invention, preferred embodiments of the present invention are described and illustrated below. The embodiments described herein are only used to explain this invention and are not intended to limit. The description of each embodiment in various places in the specification does not necessarily mean that any feature or embodiment is mutually exclusive or alternative to other embodiments. It will be clearly or implicitly understood by those skilled in the art that certain features of the embodiments described in this specification may be combined with certain features of other embodiments without conflict. As used in this specification, the terms "a", "an", "the", "these", and the like do not denote quantitative limitations, and they may be singular or plural. The terms "including", "possessing", etc. and any variations thereof use in this specification are intended to cover non-exclusive inclusion. As used in this specification, the terms "connected to", "linked to" "coupled to" and the like are not necessarily limited to physical or mechanical connections, but may include electrical connections, whether directly or indirectly, including wireless data connections. As used in this specification, the term "a plurality of" refers to two or more. As used in this specification, the terms "first", "second", "third" and the like are only for distinguishing similar objects, and do not represent a specific order for the objects.

Figure 1:
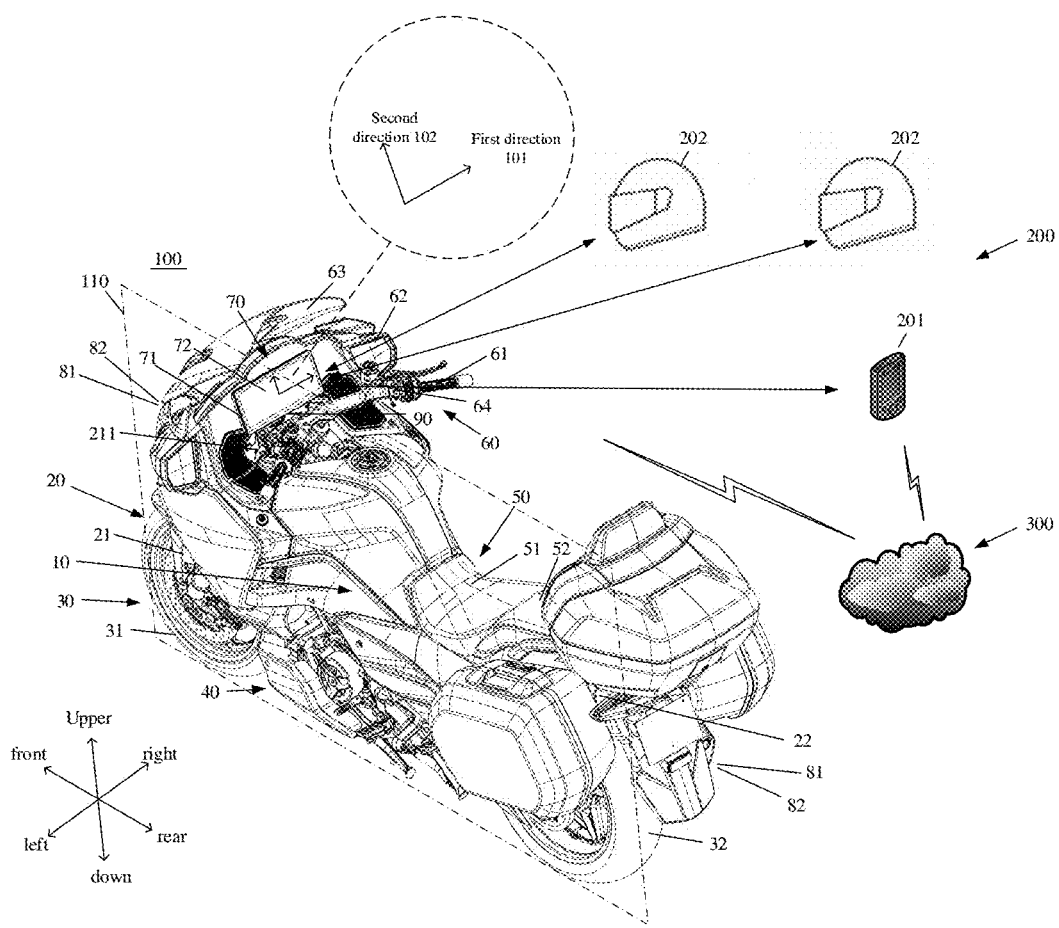
FIG. 1 is a left rear perspective view of a motorcycle in an embodiment of the present invention.
Figure 2:
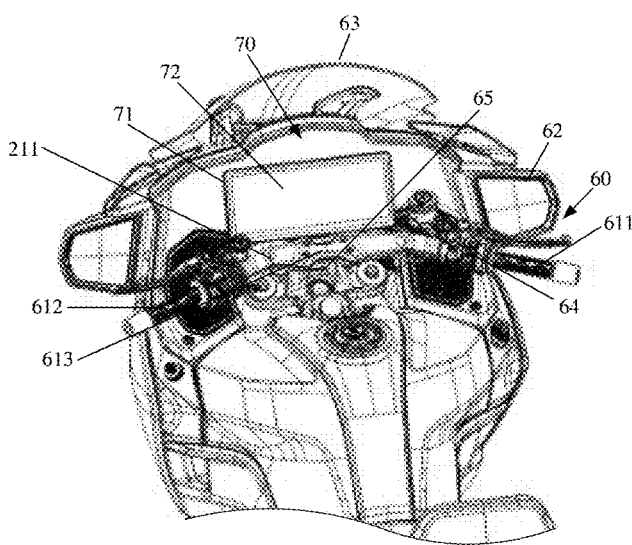
FIG. 2 is a rear perspective view of a portion of the vehicle shown in FIG. 1.

As shown in FIGS. 1 and 2, a preferred vehicle 100 is a motorcycle with various components including a frame 10, a suspension system 20, a plurality of wheels 30, a power system 40, at least one seat 50, a manipulation system 60, and a centralized control system 70.

The vehicle 100 has a front end and a rear end based on a traveling direction. The general orientations of front, rear, up (upper), down (lower), left and right for the off-road vehicle 100 are defined in FIG. 1 for clarity. The wheels 30 include a front wheel 31 and a rear wheel 32. The front wheel 31 is connected to the frame 10 through a front suspension 21, and the rear wheel 32 is connected to the frame 10 through a rear suspension 22. A power system 40 for providing power for the locomotion of the motorcycle is disposed on the frame 10. At least one of the front wheel 31 and the rear wheel 32 is connected to the power system 40 in a transmission mode. The seat 50 is arranged on the frame 10 and includes at least one driver seat 51. The manipulation system 60 is used to manipulate the operation of the vehicle 100. Optionally, all or some of the components in the manipulation system 60 are electrically connected to the power system 40. The manipulation system 60 includes a direction manipulation component 61 such as a steering wheel or in this embodiment using handlebars 613. As shown, the direction manipulation component 61 is located, for example, above the front wheel 31 and in front of the driver seat 51.

The centralized control system 70 includes a control unit 71 and a display screen 72. As shown by comparing FIGS. 4 and 5, the control unit 71 is capable of controlling the display screen 72 to display one or a plurality of instrument images 750 and one or a plurality of entertainment images 780 in at least two different and switchable display modes. The at least two different and switchable display modes include a first display mode shown in FIG. 4/represented in FIG. 6, and a second display mode shown in FIG. 5/represented in FIG. 7. In the first display mode of FIGS. 4 and 6, an area occupied by the instrument images 750 on the display screen 72 is greater than an area occupied by the entertainment images 780 on the display screen 72. In the second display mode of FIGS. 5 and 7, the area occupied by the instrument images 750 on the display screen 72 is less than or equal to the area occupied by the entertainment images 780 on the display screen 72.

In the preferred embodiment, the centralized control system 70 controls the display screen 72 to display both instrument images 750 and entertainment images 780, and thus the display screen 72 has functions of both instrument screen and entertainment screen. The display screen 72 can provide users with at least two different display modes to switch and adjust the displayed images in different display modes (corresponding to different user needs), which is beneficial for users to view relevant information. Displaying instrument images 750 and entertainment images 780 in different display modes overcomes the shortcomings of single display function and limited display area in existing motorcycles, expands the display function of the display screen, and expands the display area available for both instrument display and entertainment display. In this way, the space in the front area of the motorcycle 100 can be fully utilized to arrange the display screen 72. Although the display screen 72 displays both instrument images 750 and entertainment images 780 in both the first (instrument-focused) display mode and second (entertainment-focused) display mode, there are significant differences between the two display modes. The first display mode of FIGS. 4 and 6 mainly displays instrument information, and may be referred to as the "full-screen display mode". The second display mode of FIGS. 5 and 7 predominantly displays entertainment information, and may be referred to as the "split-screen display mode".

It should be noted that the display screen 72 in the preferred vehicle 100 is a single piece complete display screen, rather than a split screen or two screens, thus fully utilizing the relatively compact space in the front area of vehicle 100. Compared to arranging two relatively small split screens, there is no need to be limited by the display limitations of the two screens. In existing motorcycles, the size of the instrument panel may be reduced in order to arrange the entertainment display screen within limited space, thereby making both the entertainment display and instrument panel smaller. Users then need to view instrument information and entertainment information separately on two relatively small display screens. When entertainment display is not needed, the users can only view instrument information through the relatively small instrument panel, which significantly reduces the convenience of users viewing relevant information. The technical solution of the present invention solves this technical problem well, which is beneficial for drivers to view relevant information. Moreover, the single piece display screen allows a unified display style, thereby giving the driver a better visual experience and saving the cost of manufacturing a second display screen.

As used herein, the term "user" may refer to a driver, passengers, or other personnel using the centralized control system of the vehicle.

The working mode of control unit 71 and the control method of display screen 72 may be quite different in the two different display modes. For example, the preferred vehicle 100 has at least two operating systems running in the control unit 71, and the control unit 71 controls the display screen 72 to display instrument images 750 and entertainment images 780 based on the multiple operating systems. A first operating system receives real-time instrument information and controls the display screen 72 to display the corresponding instrument images 750 in real-time during running of the vehicle 100. A second operating system runs an entertainment application upon receiving control commands and controls the display screen 72 to display the entertainment images 780 corresponding to the entertainment application. In at least the second (entertainment-focused) display mode, the images generated by the two operating systems need to be fused and then provided to the display screen 72 for displaying an entire interface on the display screen 72 at the same time.

The electrical/electronic architecture of the control unit 71 which can run at least two operating systems is different from that of on-board centralized control systems in existing motorcycles. In the preferred embodiment, the at least two operating systems run in two processing kernels. The centralized control system 70 can further provide users with richer and more convenient human-computer interaction methods, such as touch screen, voice control, remote interconnection control, or the like. Moreover, one or a plurality of centralized operation controls 64 (such as hard buttons 64 on the handlebars 613) are arranged on the manipulation system 60 of vehicle 100 to improve the convenience for drivers to quickly operate key functional items during driving.

The control unit 71 is capable of controlling the display screen 72 to display instrument images 750 and entertainment images 780. The instrument images 750 described herein refers to images used to show at least vehicle driving information and vehicle status information. Users can know vehicle driving information and vehicle status information at any time by viewing the instrument images 750, thereby ensuring a good driving experience for users. The entertainment images described herein refer to images used to show a running entertainment application and/or an entertainment application to be run that can be supported. The entertainment applications are selected from at least one of the group consisting of navigation applications, multi-media applications, driver assistance applications, voice control applications, and interconnection network applications.

Figure 4:
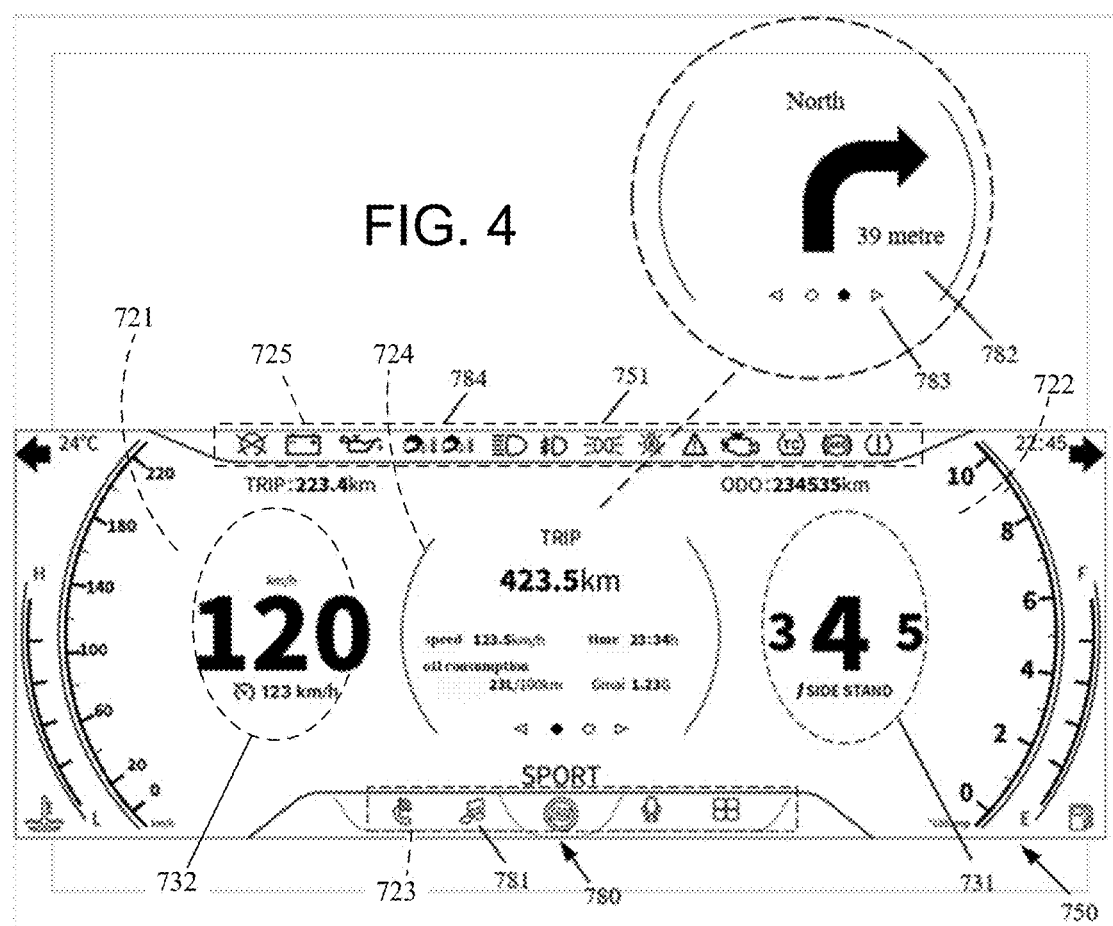
FIG. 4 is a rear view of the display interface of the display screen of FIGS. 1 and 2 in the first (instrument-focused) display mode.

Both the above instrument images 750 and the above entertainment images 780 may include one or more combination of text images, numerical images, and shape images. Some vehicle driving information may be represented by both instrument text images and instrument numerical images. For example, a driving speed of "120 km/h" as shown in FIG. 4 includes the instrument text image ("km/h") and instrument numerical image ("120"). Similarly, gear information of vehicle can be represented by both instrument text images (such as "gear", not shown in FIG. 4 but shown in FIG. 5) and instrument numerical images (such as "4" (FIG. 4) or "3" (FIG. 5)). Some vehicle driving information may be represented by all three of instrument text images, instrument numerical images, and instrument shape images. For example, a dial may be displayed by a shape image (circular shape). The dial information may be represented by instrument text images (measurement unit), instrument numerical images (the number in the dial), and instrument shape images (pointer pattern). As another example, the cruise control speed setting is shown in FIG. 4 including a shape image icon, the instrument numerical image ("123") and the instrument text image ("km/h"). Other vehicle status information may be represented solely by instrument shape images (such as an icon meaning "front lighting indicator"). Similarly, the shape images may include a battery indicator icon, an oil indicator icon, a front fog light indicator icon, a water temperature alarm icon, a low temperature icon (such as a snowflake), and the like.

In a preferred multi-media application, file names, playback modes, lyrics, and subtitles are displayed by entertainment text images. The playback duration is displayed by entertainment numerical images. The shape of notes and radios are displayed by entertainment shape images. Entertainment shape images may also include one or a plurality of entertainment application status icons 784 or one or a plurality of entertainment shortcut icons 781. The above examples are described by way of representation and not limitation.

The present invention may be implemented in various types of vehicles divided into different types, including two-wheeled vehicles, three-wheeled vehicles, and four-wheeled vehicles. Two-wheeled vehicles having one front wheel and one rear wheel to which the present invention applies include Naked bike (NK), Sport Racing (SR), cruiser, touring, rally, off-road, SuperMoto, scooter, and underbone motorcycles, or the like. Three-wheeled vehicles having one front wheel and two rear wheels to which the present invention applies include special vehicles, such as regular powered tricycles, which are mostly used as production tools. Three-wheeled vehicles including two front wheels and one rear wheel to which the present invention applies similarly include special vehicles, such as reverse tricycles, which are relatively rare, such as Bombardier reverse tricycles. Three-wheeled vehicles having a front wheel, a rear wheel, and a side wheel to which the present invention applies can be referred to as side tricycles, or may be referred to as side three-wheeled motorcycles. Four-wheeled vehicles having two front wheels and two rear wheels to which the present invention applies include ATVs (All-Terrain Vehicles, driving on various roads), UTVs (Utility Vehicles, also called multi-purpose vehicles), SSVs (Side by Side Vehicles, also called tandem vehicles), or the like. Such vehicles may be either fuel powered or electric powered. In addition, the present invention may also be applicable to other driving equipment, such as motorboats, tractors, passenger cars, airplanes, airships, and the like.

The display screen 72 is preferably located directly in front of driver seat 51. The display screen 72 may alternative be located obliquely in front of driver seat 51.

The seat(s) 50 include at least one driver seat 51, and may further include at least one passenger seat 52. The driver seat 51 and the passenger seat 52 may be arranged along a front-rear direction of the vehicle 100 as shown in FIG. 1, which on a straddle-type vehicle may be referred to as saddles, or alternatively may be arranged along a left-right direction of the vehicle 100. The driver seat 51 and the passenger seat 52 may be two separate and spaced seats, or may be two areas on a single seat. In the case where driver seat 51 and passenger seat 52 are two areas on a single seat, the driver seat 51 and passenger seat 52 can also be referred to as areas available for the driver to sit in and areas available for passenger(s) to sit in, respectively.

In FIG. 1, a longitudinal mid-plane of the driver seat 51 is defined as a plane 110. For the preferred motorcycle 100, the longitudinal mid-plane 110 is also the midpoint of the direction manipulation component 61 when the direction manipulation component 61 is in a center position. The driver seat 51 may be substantially symmetrical along the longitudinal mid-plane 110, or alternatively the driver seat 51 may not be a symmetrical structure. Further, the vehicle 100 may also be substantially symmetrical with respect to the longitudinal mid-plane 110. The display screen 72 is preferably at least partially located on the longitudinal mid-plane 110 close to the direction manipulation component 61. The longitudinal mid-plane 110 preferably intersects the display screen 72 aligning with the driver's field of view, thereby making it easier for the driver to view the images on display screen 72.

The direction manipulation component 61 may include a grip assembly having a left grip 611 and a right grip 612 as called out in FIG. 2, with a grip connection shaft or handlebars 613 connecting the left grip 611 and the right grip 612. The display screen 72 and the handlebars 613 both preferably extend across the longitudinal mid-plane 110. The display screen 72 may be located in front of the handlebars 613, behind the handlebars 613, or above the handlebars 613. There is no limitation on the structure of the direction manipulation component 61, and in another embodiment the direction manipulation component 61 may be a steering wheel.

Figure 3:
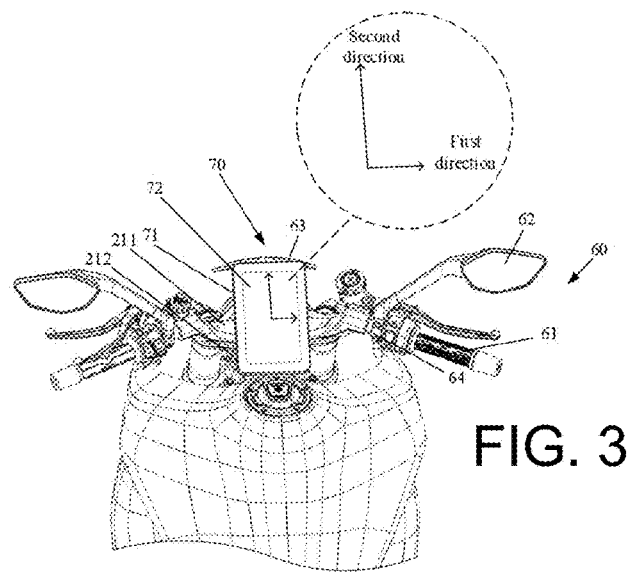
FIG. 3 is a rear perspective view of a portion of a vehicle in another embodiment of the present invention.

As further shown in FIGS. 1-3, a rear-view mirror 62 is also arranged on the front side of vehicle 100. The size and position of the display screen 72 need to be selected such that the display screen 72 does not interfere with either the direction manipulation component 61 or the rear-view mirror 62 from the driver's perspective. The display screen 72 should not obstruct the direction manipulation component 61, the rear-view mirror 62, or other structures on the vehicle 100.

In the preferred motorcycle 100, a front baffle 63 is arranged on the vehicle 100, and the display screen 72 is located behind and/or below the front baffle 63. The front baffle 63 may be manufactured by shading materials, which can prevent direct sunlight from shining on the display screen 72, thereby helping the driver to more clearly see the displayed images on the display screen 72. In other words, the front baffle 63 may be a front light baffle.

In some embodiments, the display screen 72 may be mounted on the frame 10, so the display screen 72 does not rotate with the rotation of the direction manipulation component 61. In this way, inconvenience caused by rotation of the display screen 72 can be avoided, and the driver can still easily view the displayed information on the display screen 72 in front of his or her field of view even if the vehicle 100 is turning. Fixing the display screen 72 on the frame 10 is also beneficial for extending the service life of display screen 72 and preventing damage to display screen 72.

The preferred front suspension 21 includes a front fork 211 connected to the frame 10 through a shaft 212 (called out in FIG. 3), with the lower end of the front fork 211 connected to the front wheel 31 (called out in FIG. 1) and the upper end of the front fork 211 connected to the handlebars 613 (called out in FIG. 2). In some embodiments, the display screen 72 is connected to an upper end of the front fork 211, such that the display screen 72 pivots with pivoting of the handlebars 613.

A ratio of a diagonal length of the display screen 72 to a wheelbase distance from the center of the front wheel 31 to the center of the rear wheel 32 is in the range from 0.11 to 0.3, more preferably in the range from 0.13 to 0.26, and most preferably in the range from 0.17 to A proper ratio of diagonal length of the display screen 72 to wheelbase allows the display screen 72 to be suitably sized. The diagonal length of the display screen 72 herein refers to the diagonal length of the visible area of display screen 72. The ranges recited herein include endpoint values, i.e., the range from 0.11 to 0.3 indicates that the values are greater than or equal to 0.11 and less than or equal to 0.3.

In the preferred motorcycle 100, the wheelbase distance from the center of front wheel 31 to the center of the rear wheel 32 is in the range from 1.1 m to 1.3 m, and the display screen 72 is an 8-inch display screen. In an alternative embodiment where the wheelbase distance from the center of the front wheel 31 to the center of the rear wheel 32 is in the range from 1.5 m to 1.7 m, the display screen 72 is a 12.3-inch display screen.

A ratio of the diagonal length of display screen 72 to a distance between the two most distal ends of the direction manipulation component 61 is preferably in the range from 0.19 to 0.52, more preferably in the range from 0.23 to 0.45, and most preferably in the range from 0.29 to 0.35. The preferred direction manipulation component 61 includes the left grip 611 and the right grip 612, in which case the distance between the two most distal ends of the direction manipulation component 61 refers to the distance between the most distal end of left grip 611 (away from the end of right grip 612) and the most distal end of the right grip 612 (away from the end of left grip 611).

The display screen 72 is inclined by an appropriate angle to better allow the driver to view the information on the display screen 72, typically with the display screen visible from above and with the upper edge further forward than the lower edge. When the vehicle 100 is parking on a horizontal plane with the front wheel 31 and rear wheel 32 as support points, an angle between the display screen 72 and the horizontal plane is in the range from 20° to 70°, and more preferably in the range from 35° to 55°.

The display screen 72 can extend with its longer dimension substantially in a first (transverse) direction 101 perpendicular to the plane 110, or in a second direction 102 parallel to the plane 110, i.e., the display screen 72 herein may be either a horizontal screen display or a vertical screen display. In one embodiment, as shown in FIGS. 1 and 2, the vehicle 100 comprises a horizontal display screen with its longer dimension extending along the transverse direction 101 (a left-right direction of the vehicle). All of the images displayed on display screen 72 are displayed in an up-down direction (that is, with the top and bottom of the images extending in a second direction 102 perpendicular to the first transverse direction 101). In an alternative embodiment shown in FIG. 3, the display screen 72 is a vertical display screen. The longer dimension of the display screen 72 extends along the second direction 102, but all the images displayed on the display screen 72 are still displayed in an up-down direction (that is with the top and bottom of the images extending in the second direction 102). The shorter side of the display screen 72 is parallel to the first transverse direction 101. Whether the display screen 72 is installed horizontally or vertically depends on the type of vehicle 100 and the structure or size of the front area of the vehicle 100. In addition, it may also depend on user preferences and design needs. A left-right direction is defined based on the user riding on vehicle 100.

FIG. 3 is a perspective view of a vehicle front area in an alternative embodiment, in which the display screen 72 is vertically mounted on the vehicle 100. In certain scenarios, vertical screen displays have beneficial effects compared to the horizontal screen displays. For example, some vehicles cannot be equipped with a larger display screen due to the narrow and long design of the vehicle front area. In this case, a vertical display screen can have a larger size than a horizontal display screen. Additionally, a vertical display may have better performance for displaying certain user interfaces.

Figure 8:
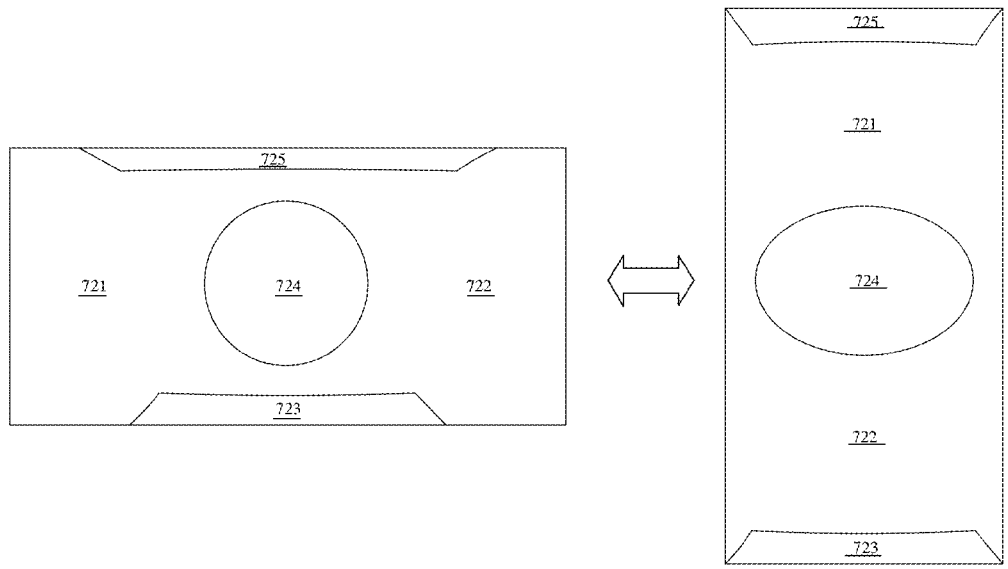
FIG. 8 is a schematic diagram showing adjustment in the display interface of FIGS. 4 and 6 when the display screen is turned in an embodiment of the present invention.
Figure 9:
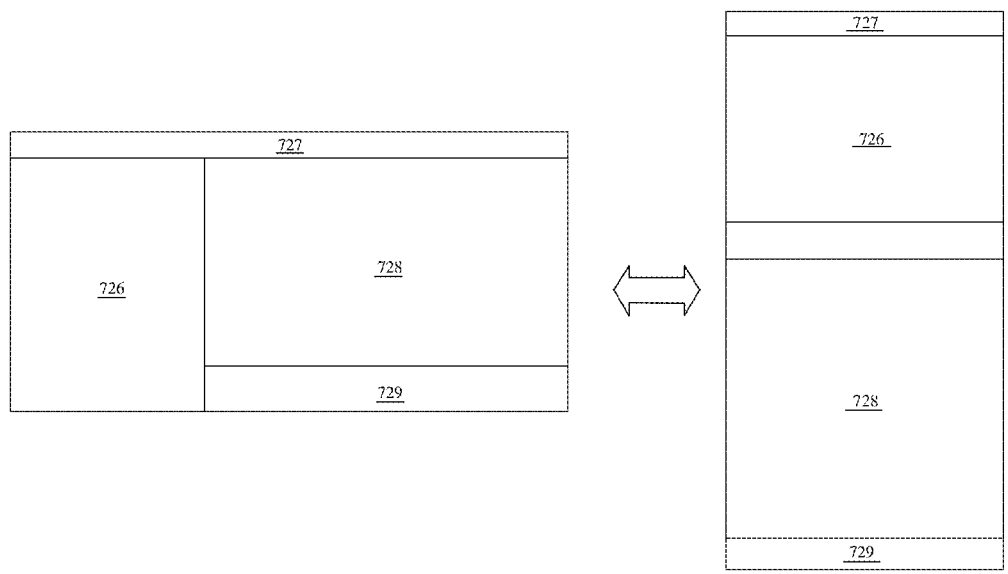
FIG. 9 is a schematic diagram showing adjustment in the display interface of FIGS. 5 and 7 when the display screen is turned.

Alternatively, the display screen 72 may be a rotatable display screen as further represented in FIGS. 8 and 9. The display screen 72 is connected to the frame 10 or front suspension 21 of the vehicle 100 (preferably, connected to the front fork 211) so as to allow rotation relative to the frame 10 or front suspension 21. In one embodiment, the vehicle 100 further includes a connection structure 90 (called out in FIG. 1), and the display screen 72 is connected to the frame 10 or front suspension 21 through the connection structure 90. The connection structure 90 allows the display screen 72 to be rotated about an axis perpendicular to the display screen 72. The control unit 71 is capable of controlling the display screen 72 to rotate the images on the display screen 72 based on gravity sensing, control signals, or the like. Rotating images displayed on display screen 72 refers to rotating the displayed images relative to display screen 72. The control unit 71 is capable of controlling the display interface of the display screen 72 to perform adjustment to facilitate users to view relevant information and to make reasonable use of the display area of the display screen.

Figure 6:
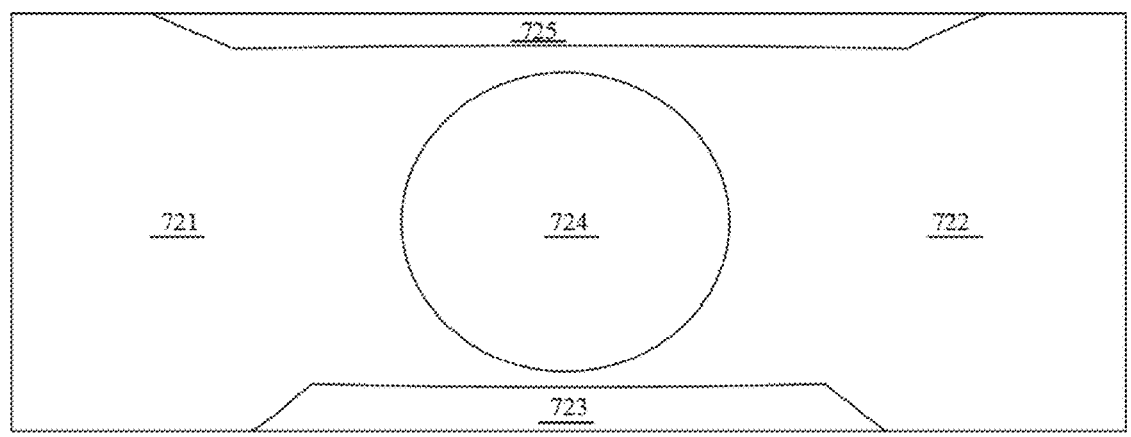
FIG. 6 is a schematic diagram of the display interface of FIG. 4 identifying display areas.

For instance, FIG. 8 demonstrates adjustment made to the first mode of display interface of FIGS. 4 and 6 of the display screen 72 under control of the control unit 71 when the display screen 72 is rotated between horizontal and vertical configurations. The adjustment of FIG. 8 comprises switching the arrangement of a first portion 721 and a second portion 722 of instrument images between a left-right arrangement and an upper-lower arrangement. It will be understood that the arrangement of images on the display interface is mainly adjusted by adjusting the position relationship of various portions of the instrument images 750 in the first (instrument-focused) display mode, and not by adjusting size or aspect ratio of any of the text images, numerical images, and shape images.

Figure 5:
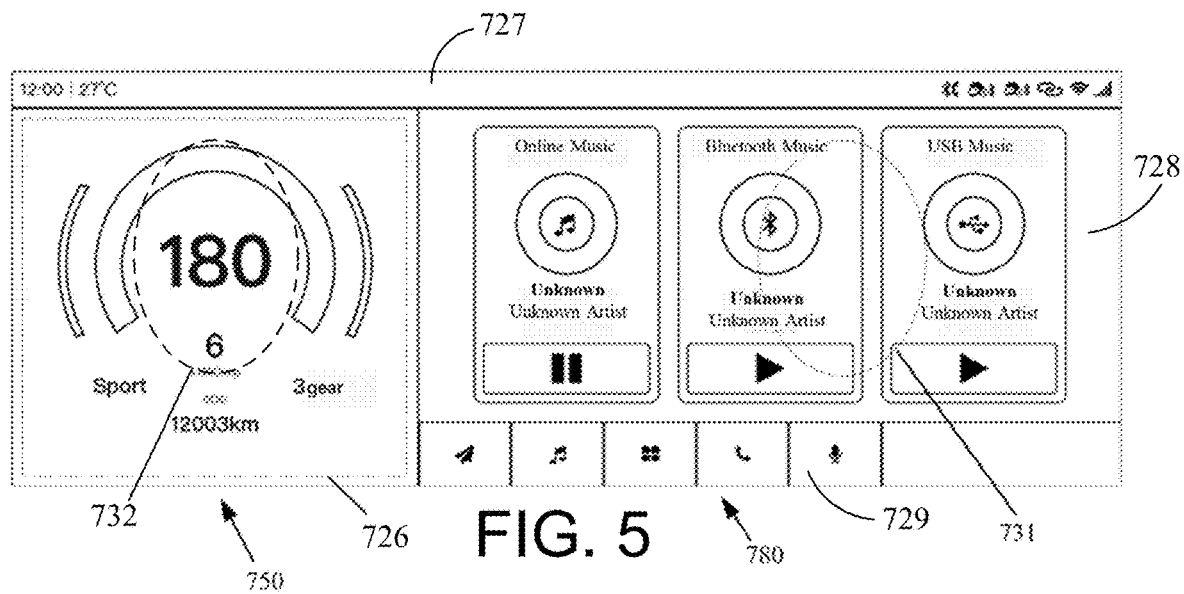
FIG. 5 is a rear view of the display interface of the display screen of FIGS. 1 and 2 in the second (entertainment-focused) display mode.
Figure 7:
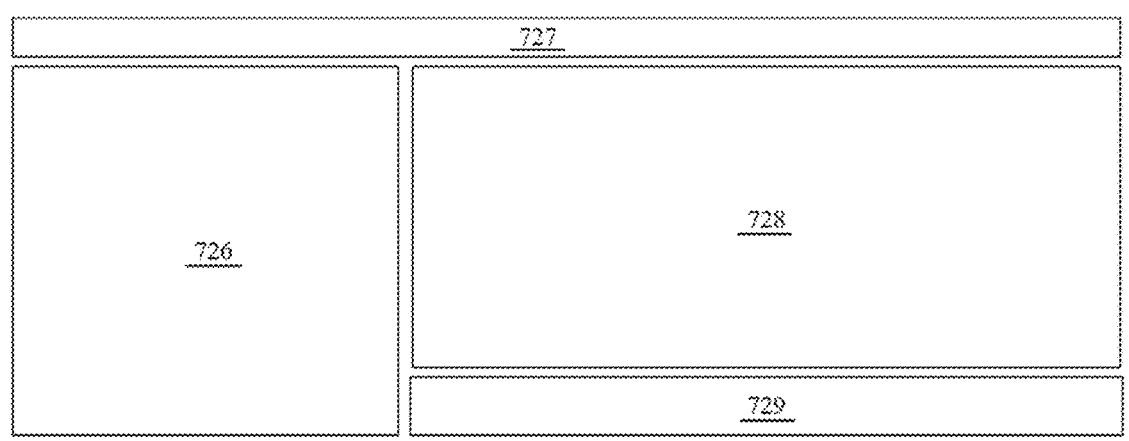
FIG. 7 is a schematic diagram of the display interface of FIG. 5 identifying display areas.

FIG. 9 demonstrates adjustment made to the second mode of display interface of FIGS. 5 and 7 of the display screen 72 under control of the control unit 71 when the display screen 72 is rotated between horizontal and vertical configurations. The adjustment of FIG. 9 comprises switching the arrangement of at least some of the instrument images 750 displayed in area 726 and at least some of the entertainment images 780 displayed in area 728 between a left-right arrangement and an upper-lower arrangement. It can be seen that, unlike in the adjustment of the first (instrument-focused) display mode made in FIG. 8, the positional relationship of at least some of the entertainment images 780 in area 728 changes relative to the instrument images 750 in area 726.

The display screen 72 may be connected to the vehicle 100 in an embedding method or in a protruding method. The embedding method refers to the back of the packaging shell of the display screen 72 being embedded in the vehicle 100 without being exposed. The protruding method specifically refers to the back of the packaging shell of the display screen 72 being at least partially exposed, connected to the vehicle 100 only through a portion of the back area or through at least some of the lower area. The arrangement of the display screen 72 is related to the type of vehicle, and the arrangement of the display screen varies for different vehicles.

The centralized control system 70 will be described in further detail below. Initially, it should be noted that the centralized control system 70 may be manufactured independently of the vehicle body and mounted on vehicle 100, or may be manufactured as a portion of the vehicle 100.

As mentioned, the centralized control system 70 includes a control unit 71 and a display screen 72. In some embodiments, the control unit 71 and display screen 72 may be encapsulated together through an encapsulated shell to form an integrated machine screen, which is electrically connected to the power system 40 on the vehicle 100 by a conductive structure (such as wires) and mechanically connected to the frame 10 or front fork 211 on the vehicle 100 by the connection structure 90. The connection structure 90 is a mechanical connection structure such as a fastener or connector. The conductive structure and the mechanical connection structure 90 may also be manufactured integrally, so that the installation between the centralized control system 70 and the frame or front fork 211 of the vehicle 100 can be completed through only one connection. In such an embodiment, the arrangement of the centralized control system 70 determines the arrangement of the display screen 72. In an alternative embodiment, the control unit 71 and the display screen 72 are separately arranged on vehicle 100. In other words, while the display screen 72 is at least partially located on longitudinal mid-plane 110, the arrangement of the control unit 71 is not limited to such a location, and the control unit 71 can be located at any position on vehicle 100. Regardless of where located on the vehicle 100, an electrical connection is required between the control unit 71 and the display screen 72 to ensure the control of the display screen 72 by the control unit 71.

The preferred first and second display modes are described in further detail below. In the first (instrument-focused) display mode shown in FIGS. 4 and 6, the display interface of display screen 72 includes a first-mode instrument display area having a left area 721 and a right area 722. The first-mode instrument display area (721+722) displays necessary instrument images; such as speed of 120 km/h, 4th gear, etc., which must be provided to the driver during the running of the vehicle 100.

A bottom central area 723 identified in FIG. 6 provides a first-mode entertainment display area. The first-mode entertainment display area is used to display at least some of the first mode entertainment images, such as entertainment shortcut icons 781. The entertainment shortcut icons 781 are used to prompt the user that the centralized control system 70 can provide entertainment applications and allow users to make choices. The display screen 72 is capable of switching from the first (instrument-focused) display mode of FIGS. 4, 6 and 8 to the second (entertainment-focused) display mode of FIGS. 5, 7 and 9 when the control unit 71 detects control commands for these entertainment shortcut icons 781. The entertainment shortcut icons 781 may include shortcut icons for navigation applications, multi-media applications, voice control applications, and interconnection applications, and may further include settings, HOME, and other icons. If the display screen 72 is a touch screen, users can touch any of the shortcut icons 781 to make the display screen 72 display the corresponding interface. As an example, the note icon 781 is used to prompt and allow users to enter the music playback interface.

In an alternative embodiment, the display screen 72 includes at least a main HOME icon in the first (instrument-focused) display mode. The display screen 72 is capable of switching from the first (instrument-focused) display mode to the second (entertainment-focused) display mode after the user touches the main HOME icon, and can display more quick icons for entertainment applications for the user to choose from in the second (entertainment-focused) display mode.

The middle area 724 of the preferred display interface shown in FIGS. 4 and 6 provides a switchable display area. The switchable display area 724 is used to display some of the first mode instrument images and/or some of the first mode entertainment images. In the case where the switchable display area 724 is used to display some of the first mode instrument images, the display content is instrument images 750 which could be hidden without impairing operation of the vehicle 100, which could be called non-necessary instrument images. These non-necessary instrument images can be displayed on the display screen 72 when the driver desires to view them. For example, the fuel consumption is 23 L/100 km, etc. In the case where the switchable display area is used to display some of the first mode entertainment images (as represented in the dashed line area shown at the top of FIG. 4), the display content is a simplified entertainment image 782. The simplified entertainment image 782 displays desired entertainment information in a simple manner to save display area compared to the complete entertainment image (not shown). For example, the simplified entertainment images 782 in the switchable display area 724 as shown in FIG. 4 only display a text image of "North", a numerical/text image of "39 meters", and a shape image of a "Navigation Arrow" for navigation functions, but does not display a complete map. The text image of "North", numerical/text image of "39 meters", and shape image of a "Navigation Arrow" form a simple navigation message meaning "the vehicle is running north and should turn right after 39 meters". As another example, only some text information (such as some lyrics) may be displayed for the multi-media playback function.

The control unit 71 is capable of controlling the switchable display area 724 of the display screen 72 to switch from a first display picture to a second display picture when the centralized control system 70 receives a first control command in the first (instrument-focused) display mode. The first display picture may be used to display a portion of the first mode instrument images, and the second display picture may be used to display some of the first mode entertainment image. In addition, the present invention does not exclude the case where both the first display picture and the second display picture are used to display a portion of the first mode instrument images or both are used to display some of the first mode entertainment images. In this case, the first display picture and the second display picture display different instrument images or different entertainment images.

A control command of controlling the switchable display area 724 of the display screen 72 to switch from a first display picture to a second display picture that is received by the centralized control system 70 (referred to a first control command) may include a swiping touch in the switchable display 724 of the display screen 72; a touch on a button icon 783 displayed on the display screen 72 (such as a touch on a left-right page flipping button displayed on the display screen 72); or a voice control command. The button icon 783 displayed on the display screen 72 may also be referred to a "soft button" to distinguish from a control command received by a certain operation control (for example, hard button 64 in the manipulation system 60) in the manipulation system 60 or other operation controls.

Alternatively, none of the display areas need be switchable. In some alternative embodiments, the display interface of the display screen 72 may not include a switchable display area 724 in the first (instrument-focused) display mode, that is to say, the display interface of the display screen 72 can include an instrument display area and an entertainment display area neither of which is switchable.

The display interface of the display screen 72 may further include a status display area in the first (instrument-focused) display mode, such as a top central area 725 in the display interface of the display screen in FIG. 6. The status display area 725 preferably displays icons 751 used to represent vehicle status information, such as front lighting indicator icon, a battery indicator icon, oil indicator icon, front fog light indicator icon, water temperature alarm icon, low temperature icon, and the like, any of which can be lit to convey information. Taking the front lighting indicator icon as an example, when it lights up, it represents that the "front lighting" is on, and when it goes out or dims, it represents that the "front lighting" is off. As another example, when the low fuel level indicator icon is lit, then the fuel level is below a threshold value, and when the low fuel level indicator icon is turned off or dims, then the fuel level is above the threshold value. At least some of these vehicle status icons 751 may be necessary for operation of the vehicle 100. If the display interface alternatively does not include a status display area 725, the vehicle status icons 751 that are necessary for operation of the vehicle 100 may alternatively be displayed as instrument images in the instrument display area (721 and/or 722).

In addition, the status display area 725 may also be used to display one or more entertainment function status icons 784, used to remind the user of the current status of entertainment applications (such as on or off state, connected or disconnected state, or the like) that the centralized control system can provide. For example, a "Bluetooth helmet icon" may light to indicate that a Bluetooth headset is connected. From this, it can be seen that each image (each icon) in the status display area 725 is capable of switching between a first state and a second state when receiving control commands, where the first state and the second state are respectively on and off.

In addition to entertainment shortcut icons 781 and entertainment function status icons 784, a third type of entertainment icons may also be displayed on the display screen 72 which serve both switching and status displaying purposes. The third type of entertainment icons can include, for example, a "Bluetooth connection icon", a "phone icon", and the like. The user clicks on the "Bluetooth connection icon" on the display screen 72 when they want to turn on the Bluetooth. Correspondingly, the "Bluetooth connection icon" will switch from off state to on state; thereby initiating a Bluetooth connection. In addition, a "phone icon" can not only represent functional status information, but also serve as one of the entertainment shortcut icons 781. When the "phone icon" lights up, it indicates either that a call is waiting to be answered or that the call is currently playing. At the same time, users can answer or reject the call by touching the "phone icon". The third type of entertainment icons may be displayed in the first-mode entertainment display area 723, the switchable display area 724, the status display area 725, or any other suitable area.

The simplified entertainment images 782, the entertainment shortcut icons 781, and the entertainment application status icons 784 may be displayed in the same area or in different areas. Further, the display areas 721, 722, 723, 724 and 725 in the first (instrument-focused) display mode of the display screen 72 as shown in FIG. 6 are divided for the convenience of discussion. In practical applications, such a clear division may not be necessary.

In a different alternative embodiment, the entertainment images 780 include only entertainment shortcut icons 781. In other words, the display screen 72 in the first (instrument-focused) display mode only prompts the user that the centralized control system 70 can provide entertainment applications, but does not display further information related to such entertainment applications in the first (instrument-focused) display mode.

A ratio of an area (721+722+725+possibly 724) occupied by the instrument images 750 on the display screen 72 to an area (723+possibly 724) occupied by the entertainment images 780 on the display screen 72 is preferably in the range from 3 to 20 in the first (instrument-focused) display mode, more preferably in the range from 6 to 15, and most preferably in the range from 8 to 12. Using such ratios, almost the entire screen of the display screen 72 displays instrument images 750 under control of the centralized control system 70 when users do not need entertainment applications, thereby making it more convenient for users to view instrument information. Meanwhile, although the area (723+possibly 724) occupied by entertainment images 780 on the display screen 72 is relatively small, the information can still be clearly displayed.

The user can switch the display screen 72 from the first (instrument-focused) display mode to the second (entertainment-focused) display mode when desired to use entertainment applications. Thus, the size of the instrument images 750 on the display screen 72 can be reduced and/or some of the instrument images 750 can be hidden, thereby increasing area for displaying entertainment images 780. In this way, a display screen 72 is capable of adjusting the displayed content and its occupied area in different display modes.

In the second (entertainment-focused) display mode shown in FIGS. 5, 7 and 9, the display interface of display screen 72 includes a second-mode instrument display area 726 and a second-mode entertainment display area 728. The second-mode instrument display area 726 may be, for example to the left of the second-mode entertainment display area 728. The second-mode instrument display area 726 displays at least the necessary instrument images to continuously provide the necessary instrument information for the user to operate the vehicle 100. Images representing vehicle driving information may be displayed in the left area 726, for example, by a circular instrument. In addition, the second-mode instrument display area 726 may also display unnecessary instrument images, or one or more unnecessary instrument images can be hidden such that the number of the instrument images 750 displayed on display screen 72 in the second (entertainment-focused) display mode may be smaller than the number of the instrument images 750 displayed on display screen 72 in the first (instrument-focused) display mode, thereby increasing area for displaying entertainment images 780 in the second (entertainment-focused) display mode.

The second-mode entertainment display area 728 may include a complete entertainment image (not shown). The control unit 71 is capable of controlling at least one first area 731 on the display screen 72 to display the instrument images 750 in the first (instrument-focused) display mode and to display the entertainment images 780 in the second (entertainment-focused) display mode. The first area 731 is a portion of the area occupied by the instrument images 750 on the display screen 72 in the first (instrument-focused) display mode, and also where entertainment images 780 are displayed in the second (entertainment-focused) display mode. Taking the display interface shown in FIGS. 4 and 5 as an example, the first area 731 may be in the right side of the middle area (i.e. an area which overlaps between 722 in FIGS. 6 and 728 in FIG. 7). In a preferred embodiment, the first area 731 may be a partial display area of the display screen 72.

In addition, the display interface of the display screen 72 in the second (entertainment-focused) display mode may also include a status display area 727, such as at the top in FIG. 7. Like the status display area 725 in the first (instrument-focused) display mode, the status display area 727 in the second (entertainment-focused) display mode may be used to display vehicle status icons 751 and entertainment application status icons 784. The vehicle status icons 751 may also be displayed in the second-mode instrument display area 726, and the entertainment application status icons 784 may also be displayed in the second-mode entertainment display area 728.

The entertainment shortcut icons 781 may be displayed in the bottom right area 729. The entertainment shortcut icons 781 displayed in the second (entertainment-focused) display mode may appear identical to or different from the entertainment shortcut icons 781 displayed in the first (instrument-focused) display mode, both in number and image displayed, with the number of entertainment shortcut icons displayed in the second (entertainment-focused) display mode being greater than or equal to the number of the entertainment shortcut icons displayed in the first (instrument-focused) display mode. The number of the entertainment images 780 displayed on display screen 72 in the second (entertainment-focused) display mode may be greater than the number of the entertainment images 780 displayed on display screen 72 in the first (instrument-focused) display mode, which is more convenient to view complete entertainment information.

Optionally, the entertainment images 780 corresponding to each entertainment application may be switched in the second-mode entertainment display area 728, or may be further divided and displayed in the second-mode entertainment display area 728. In addition, they may also be displayed in thumbnail, negative screen, floating window, and the like.

Figure 10:
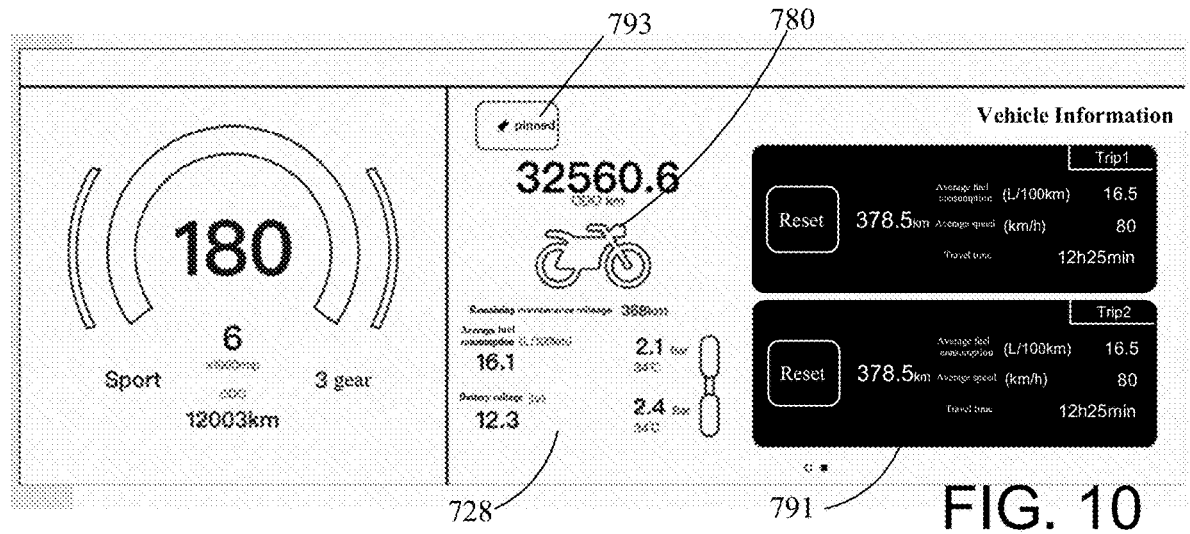
FIG. 10 is a rear view of the display interface of the display screen in the second (entertainment-focused) display mode, but showing a second set of entertainment images.

FIG. 10 shows the display interface of the display screen 72 in the second (entertainment-focused) display mode using second mode entertainment images 780. As shown in FIG. 10, images related to vehicle information (such as "remaining maintenance mileage of 368 km", "average fuel consumption (L/100 km) of 16.5", "average speed (km/h) of 80", or the like) are displayed in the second-mode entertainment display area 728. Although these images are related to vehicle information, they are generated by the second operating system, which is different from the instrument images generated by the first operating system.

In addition, in order to allow users to quickly view the images related to vehicle information, the above images may be displayed on a negative screen 791 of display screen 72. The negative screen 791 may be initiated be a negative screen call out on a communicating phone 201. The call out of negative screen 791 may also be by touch control on the display screen 72, operation control using hard buttons 64, or voice control. The call out of negative screen 791 may also be by a swiping operation from top to bottom or from bottom to top on the display screen 72. The number of the negative screens 791 may be one, two or more to display a plurality of related images. For instance, the negative screen 791 shown in FIG. 10 includes a first negative screen and a second negative screen. The switching between the first negative screen and the second negative screen may be by a swiping operation from left to right or from right to left on the display screen 72 after the negative screen 791 is called out. The negative screen 791 shown in FIG. 10 may include a "pinned" icon, which may be a touchable soft button 793. The current negative screen 791 on the display screen 72 may be pinned for a predetermined time length by touching the "pinned" soft button 793.

Preferably, the display screen 72 may also include at least one third area (not shown) in the first (instrument-focused) display mode in order to prompt the user that the centralized control system 70 can provide entertainment applications (i.e. the loaded entertainment applications that can be supported by the second operating system). The control unit 71 is also used to control at least one third area on the display screen 72 to display entertainment images 780 in the first (instrument-focused) display mode. Preferably, the entertainment images 780 displayed in the third area are entertainment shortcut icons 781. The third area is an area on the display screen 72 other than the first area 731. In addition, the entertainment images 780 may also include entertainment application status icons 784, simplified entertainment images 782, and the like.

Correspondingly, the control unit 71 may also be used to control at least one second area 732 on the display screen 72 to display instrument images 750 in the second (entertainment-focused) display mode in order to continuously provide instrument information to the user. The second area 732 refers to any area on the display screen 72 other than the first area 731, and may either overlap the third area or be different from the third area. The control unit 71 is used to control display screen 72 to display instrument images 750 in both the first (instrument-focused) display mode and second (entertainment-focused) display mode for driving safety.

It can be seen that in the vehicle 100 of the present invention, the centralized control system 70 is capable of controlling the same area (at least one first area 731) on the display screen 72 to display instrument images 750 or entertainment images 780 in different display modes, without requiring two display screens (such as an instrument screen separate from an entertainment screen).

The centralized control system 70 after started controls the display screen 72 to work in both the first (instrument-focused) display mode and the second (entertainment-focused) display mode and to switch between the first (instrument-focused) display mode and the second (entertainment-focused) display mode. The positions of any images displayed in the first (instrument-focused) display mode and the second (entertainment-focused) display mode are preferably defined by the system in advance. The relevant images are placed on the relevant coordinate system when displaying.

In the preferred embodiment, when the centralized control system 70 is first started, the control unit 71 controls the display screen 72 to display images first in the first (instrument-focused) display mode. This provides users with more complete instrument information in a larger area. The display screen 72 is switched from the first (instrument-focused) display mode to the second (entertainment-focused) display mode thereafter by the user to provide entertainment information based on user desires and preferences.

A startup screen (not shown) could alternatively be displayed when the centralized control system 70 is started. If there is a startup screen, the control unit 71 controls the display screen 72 to enter the first (instrument-focused) display mode after the startup screen, and then enters the second (entertainment-focused) display mode only based upon switching by the user. In other words, after the centralized control system 70 is started, compared to the second (entertainment-focused) display mode, the first (instrument-focused) display mode is always entered earlier.

The display screen 72 is preferably switched from the first (instrument-focused) display mode to the second (entertainment-focused) display mode based on one or more predetermined commands, such as pressing one of the entertainment shortcut icons 781 in the display interface of the display screen 72 in the first (instrument-focused) display mode, selection of a certain entertainment shortcut icon 781 through the operation controls 64, or based on voice control. Alternatively, the control unit 71 may control the display screen 72 to switch from the first (instrument-focused) display mode to the second (entertainment-focused) display mode after the second operating system meets a predetermined condition. The predetermined condition may be, for example, that the startup of the second operating system has been completed, or that the startup of the second operating system has been completed for a predetermined time length.

The predetermined time length may be generated based on user settings, or automatically generated and saved based on user preferences by the control unit 71. Optionally, the touch function of the display screen 72 could be locked during vehicle motion (or motion above a threshold speed) to ensure driving safety, and users can switch display modes only through voice control or operation of controls 64. After stopping the vehicle 100 (or driving below a threshold speed), the touch function will be turned on again.

The display screen can be switched from the second (entertainment-focused) display mode back to the first (instrument-focused) display mode based on an operating state of the second operating system; or based on a second predetermined command of the control unit 71; or when the control unit 71 detects a second display mode switching command. The operating state of the second operating system may include, for example, the end of the entertainment application provided by the second operating system, such as the end of navigation application. This second predetermined command of control unit 71 is similar to the first predetermined command of the control unit 71, and may be generated based on the user settings or preferences. The display screen 72 is switched from the second (entertainment-focused) display mode to the first (instrument-focused) display mode based on the second predetermined command. The second display mode switching command may be similar to the first display mode switching command, and may include for example, long press on the operation controls, voice control for switching display mode, or the like.

In general, the display screen 72 is capable of displaying both the instrument images 750 corresponding to the instrument information and the entertainment images 780 corresponding to the entertainment function by switching between the two display modes (the first (instrument-focused) display mode and the second (entertainment-focused) display mode). Further, the generation of the instrument images 750 and the provision of entertainment applications both rely on the support of control unit 71.

The present invention involves at least two operating systems running simultaneously in the control unit 71. The control unit 71 controls the display screen 72 to display instrument images 750 and entertainment images 780 based on the at least two operating systems. The first operating system is always running when the vehicle 100 is running, and receives real-time instrument information and controls the display screen 72 to display the corresponding instrument images 750 in real-time when the vehicle 100 is running. The first operating system may include, for example, a RTOS (Real Time Operating System) system, a QNX system (originally developed by Quantum Software Systems of Ontario, Canada, later renamed QNX Software Systems), or a Linux system. The RTOS system may use the FreeRTOS system (a small real-time operating system). The first operating system starts running earlier than the second operating system. The second operating system runs the entertainment application upon receiving control command and controls the display screen 72 to display the entertainment images 780 corresponding to the entertainment application. The second mode entertainment images displayed on the display screen 72 are generated and displayed based on control of the second operating system. The second operating system may include, for example, an Android system or a Linux system. In addition, other intelligent operating systems that can be applied to a mobile terminal 200 can also be adopted.

The first operating system and the second operating system are two different operating systems from each other. Therefore, at least two different operating systems are running on control unit 71. For example, if the first operating system is a Linux system, the second operating system is not a Linux system.

The images generated by each operating system need to be fused and then provided to the display screen 72 for displaying an entire interface on the display screen 72 at the same time. How the display interface on display screen 72 is generated in the first and second display modes is described in detail below.

The first mode instrument images are generated under control of the first operating system based on the received instrument information. The instrument information may also be referred to as "instrument data", for example, in the form of data within the control unit 71. The instrument information often refers to information related to the body of vehicle 100, sometimes also known as "vehicle body information". The first mode instrument images generated under control of the first operating system are located on at least one layer.

Certain entertainment images may be generated under control of the first operating system. In particular, the first operating system generates the first mode entertainment images based on entertainment data. In the present invention, entertainment data is provided by the second operating system. Some second mode entertainment images may also be generated under control of the first operating system in the second (entertainment-focused) display mode, for example, the entertainment shortcut icons 781. Some of the entertainment data can preferably be provided in real-time by the second operating system, such as the entertainment data required to generate the simplified entertainment images 782. Another portion of the entertainment data (such as the entertainment data required to generate the entertainment shortcut icons 781) can be pre-stored in a storage space of the control unit 71 as it does not change frequently, without the need to be provided in real time by the second operating system. In this way, after the centralized control system 70 is started, the display interface in the first (instrument-focused) display mode can be generated entirely based on the first operating system. If the first (instrument-focused) display mode does not include the simplified entertainment images 782, all first mode images can be generated without real-time entertainment data provided by the second operating system. In other words, the first mode display interface can be displayed without waiting for the second operating system to run. The entertainment application status icons 784 are neither lit nor active until the second operating system runs. The first operating system preferably pre-stores entertainment application status icons 784. After the second operating system begins running, the first operating system controls the generation of entertainment application status icons 784 based on real-time entertainment data provided by the second operating system after the state changes.

In the display interface shown in FIG. 10, images related to vehicle information are displayed in the second-mode entertainment display area 728, but these images are supported by the entertainment application, which provides options for displaying these images. Correspondingly, these images are generated under control of the second operating system, based on instrument data provided by the first operating system. In an alternative embodiment, the images generated under control of the second operating system are displayed in a floating window in the second-mode entertainment display area 728.

The first mode entertainment images generated are located on at least one layer. For clarity of expression, the layer where first mode instrument images are located is defined as layer A, and the layer where the first mode entertainment images are located is defined as layer B. Both layer A and layer B are generated under control of the first operating system. Both layer A and layer B may be one or a plurality of layers. The first mode instrument images of layer A and the first mode entertainment images of layer B can be generated through graphical rendering.

Layer A and layer B are fused to generate the first display interface, which is the display interface in the first (instrument-focused) display mode. The fusion of layer A and layer B is completed under control of the first operating system. Further, the first display interface is sent to the display screen 72 for display under control of the first operating system.

In order to ensure that all images in the first display interface can be clearly provided to users for viewing, the images in layer A and the images in layer B should not obstruct each other. For example, the images in layer A occupy a portion of the entire interface, and the entire interface includes one or a plurality of blank areas in addition to the occupied areas. The images in layer B are arranged overlaying the blank areas of layer A in the display interface. The images in layer A and the images in layer B are displayed in each area of the first display interface by overlaying layer A and layer B. Overlaying images up and down to produce special visual effects does not constitute a situation where images obstruct each other.

In the second (entertainment-focused) display mode, at least some of the entertainment images 780 are generated under control of the second operating system. The portion of the second mode entertainment images generated under control of the second operating system may include complete entertainment images (not shown), and may also include a simplified entertainment image 782. All the images within the right side of the middle right area 728 in FIG. 7 may be generated under control of the second operating system.

Figure 11:
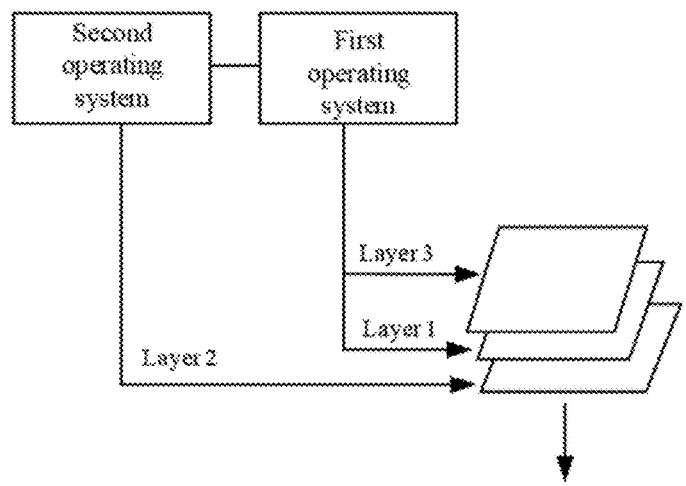
FIG. 11 is a schematic diagram of the layer fusion principle in the second (entertainment-focused) display mode in the preferred embodiment of the present invention.

In the preferred embodiment, the second mode instrument images are generated under control of the first operating system. Similar to the first (instrument-focused) display mode, the first operating system generates the second mode instrument images based on the received instrument information. FIG. 11 shows a schematic diagram of the layer fusion principle in the second (entertainment-focused) display mode. For clarity of expression and as called out in FIG. 11, the layer where the second mode instrument images are located is defined as layer 1. Layer 1 may be one layer or a plurality of layers.

At least some of the second mode entertainment images are generated under control of the second operating system. However, the preferred embodiment has a portion of the second mode entertainment images, such as the entertainment function status icons 784, generated under control of the first operating system. Thus, the top area 727 in FIGS. 5, 7 and 9 may include both vehicle status icons 751 and entertainment application status icons 784 all generated under control of the first operating system. In addition, in some embodiments, the entertainment shortcut icons 781 in the right side of the bottom right area 729 in FIGS. 5, 7 and 9 may be generated under control of the first operating system. The layer where these images are located is defined as layer 3 as called out in FIG. 11.

One or a plurality of layers containing second mode entertainment images is generated under control of the second operating system, defined as layer 2 as called out in FIG. 11. The second (entertainment-focused) display mode thus requires concurrent running of the first and second operating systems. The second operating system may provide layer(s) 2 to the first operating system directly, or may provide a fused layer to the first operating system. In the case that the second operating system provide a fused layer 2 to the first operating system, the plurality of layers generated under control of the second operating system are fused to a fused layer 2. In some embodiments, the entertainment application status icons 784 and/or the entertainment shortcut icons 781 are generated under control of the second operating system. The second mode instrument images and the second mode entertainment images can be generated through graphical rendering.

As shown in FIG. 11, the Layer 1, Layer 2, and Layer 3 are fused to generate a second display interface, which is the display interface in the second (entertainment-focused) display mode. The layer fusion between the layers provided by the first operating system (such as Layer 1 and Layer 3) and the layers provided by the second operating system (a plurality of layers, or Layer 2 obtained by fusing a plurality of layers) is completed under control of the first operating system, and the first operating system sends the fully fused display interface to the display screen 72.

Figure 12:
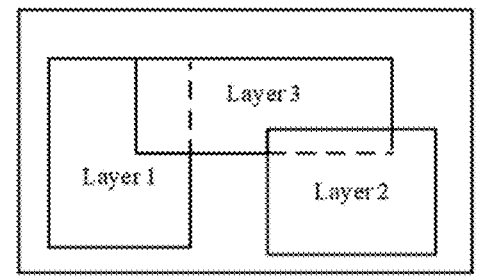
FIG. 12 is a drawing showing image fusion formed by the layer fusion of FIG. 11.
Figure 12:
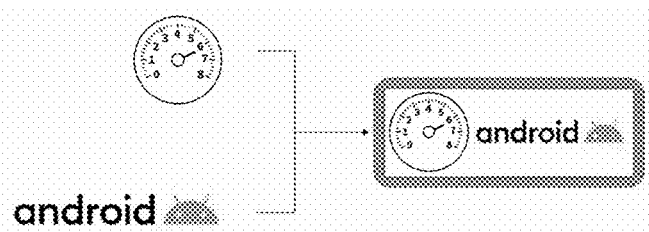

Similar to the positioning of images in layers A and B of the first (instrument-focused) display mode, the positions of each image in layer 1, layer 2, and layer 3 are different in the corresponding layers. Therefore, each image does not obstruct other images to ensure that each image in the second display interface can be clearly seen by the user. FIG. 12 is a schematic diagram representing such layer fusion in the second (entertainment-focused) display mode in an embodiment of the present invention. As shown in FIG. 12, the dashboard images (images provided by the first operating system as part of layer 1) and the Android images (images provided by the second operating system as part of layer 2) are fused to generate a complete display interface.

Similarities between the first and second display modes include a) that the display interface of the display screen 72 is generated by fusing at least one layer of the instrument images 750 and at least one layer of the entertainment images 780 through layer fusion under control of the first operating system; and b) that the display interface is sent to the display screen 72 for display under the control of the first operating system.

The first operating system and second operating system are independent of each other, but their respective images are fused through layer fusion to generate a complete display interface displayed on the display screen 72. Due to the differences in the requirements for instrument display and entertainment display in the vehicle 100, using two different operating systems to control the instrument and entertainment applications can avoid the problem of low system efficiency caused by excessive load on a single system. Using two different operating systems also avoid the problem of a single system being unable to meet the personalized requirements for instrument display and entertainment display.

Figure 13:
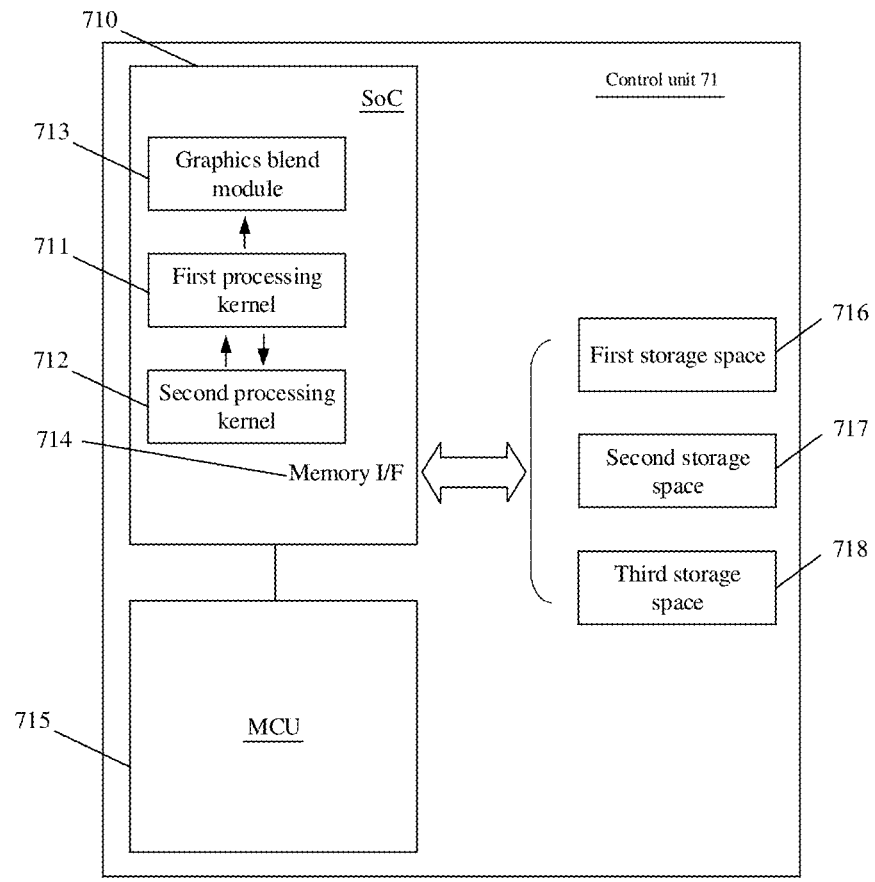
FIG. 13 is a schematic diagram of a control unit in the preferred embodiment of the present invention.

The control unit 71 needs to have corresponding hardware to support and run at least two operating systems, such as the preferred embodiment shown in FIG. 13. The preferred control unit 71 has at least two processing kernels including a first processing kernel 711 and a second processing kernel 712. The first operating system runs on the first processing kernel 711, and the second operating system runs on the second processing kernel 712. In addition, the preferred control unit 71 includes a first storage space 716, a second storage space 717, a third storage space 718, a graphics blend module 713, and the like. The first storage space 716 corresponds to the first processing kernel 711 for storing data (including images) used in the first operating system. The second storage space 717 corresponds to the second processing kernel 712 for storing data (including images) used in the second operating system. The first processing kernel 711 serves as the main processing kernel to control the graphics blend module 713. In addition, the control unit 71 may further include a Micro-controller unit (MCU) 715. MCU 715 is used for management and control, such as power management. In the preferred embodiment, the control unit 71 includes a System on Chip (SoC) 710, and the two processing kernels 711, 712 and the graphics blend module 713 are located in the SoC chip 710. MCU 715 is electrically connected to SoC chip 710. Other embodiments locate the first processing kernel 711 and the second processing kernel 712 in different chips.

Figure 14:
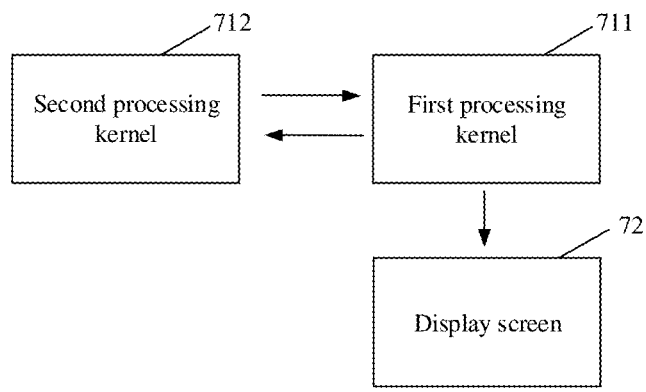
FIG. 14 is a schematic diagram of an electronic architecture driving the display screen in the preferred embodiment of the present invention.

FIG. 14 is a schematic diagram of an electronic architecture driving the display screen 72 in the preferred embodiment of the present invention. In order to synchronize the operation of the first operating system and second operating system, the first processing kernel 711 running the first operating system can be selected as the main processing kernel, which is responsible for managing the startup timing of the entire centralized control system 70.

In one embodiment, the first processing kernel 711 runs a FreeRTOS system, and the second processing kernel 712 runs an Android system. The first operating system needs to run in real-time to avoid interruptions while the vehicle 100 is moving. The FreeRTOS system running on the first processing kernel 711 has advantages of stability, safety, and not being prone to crashes. Therefore, as the main processing kernel, the first processing kernel 711 can ensure real-time acquisition of instrument data, thereby ensuring driving safety. The Android system running on the second processing kernel 712 can support rich and intelligent entertainment applications, which is difficult for the FreeRTOS system to achieve. However, there is a risk of software crashes during the use of the Android system. If the second processing kernel 712 running the Android system were to be used as the main processing kernel, there may be a situation where the display screen software crashes during driving, posing a significant danger to safe driving, The steps of storing images can be achieved through a virtual graphics driver. For example, the first operating system running on the first processing kernel 711 stores the generated first mode instrument images in the first storage space 716 through a virtual graphics driver.

The graphics blend module 713 is used to stack and fuse the images stored in the first storage space 716 (in the form of layers) according to a predetermined stacking logic to generate the first display interface in the first (instrument-focused) display mode, and store the first display interface in the third storage space 718. The graphics blend module 713 is also used to stack and fuse the images stored in the first storage space 716 and the second storage space 717 (in the form of layers) according to a predetermined stacking logic to generate the second display interface in the second (entertainment-focused) display mode. Performing layer fusion through the graphics blend module 713 is more efficient than performing layer fusion through software. The first operating system running on the first processing kernel 711 is used to control the display unit to obtain the first display interface or second display interface stored in the third storage space 718. The first display interface or the second display interface is sent to the display screen 72 for display under control of the first operating system.

The first display interface or the second display interface can be output from a video output interface (such as HDMI) to the display screen 72 through LVDS (Low-Voltage Differential Signaling) video output, driving the display screen 72 to display, achieving the first (instrument-focused) display mode or the second (entertainment-focused) display mode. The first storage space 716 and the second storage space 717 may be the same physical memory for data communication through memory sharing. If so, then the same physical memory is mapped to the process address spaces of the second operating system and the first operating system, achieving mixed unit memory sharing between the first operating system and the second operating system. The first operating system can view updates made by the second operating system in real time to shared data, and vice versa. Some synchronization mechanisms may be required, such as mutexes or semaphores, because multiple systems and units share the same memory area.

The SoC chip 710 has one or a plurality of storage interfaces (Memory I/F) 714. The first operating system and the second operating system are capable of transmitting data to the first storage space 716 and the second storage space 717 through the storage interface 714.

One benefit of using memory sharing communication is high efficiency, as the first operating system and second operating system can directly read and write to memory such as the first storage space 716 and the second storage space 717. Memory sharing only copies data twice: one from the input file to the memory shared area, and the other from the memory shared area to the output file. In fact, it is not always necessary to unmap after reading and writing a small amount of data and to re-establish a memory sharing area if a new communication occurs; instead, the shared area can be maintained until communication is completed. In this way, data is always saved in the memory share and is not written back to the file. The content in the memory share is often written back to the file only when it is unmapped. Therefore, memory sharing communication can achieve high efficiency and save data storage resources.

In an alternative embodiment, the FreeRTOS system may run on MCU 715.

The first operating system running on the first processing kernel 711 and the second operating system running on the second processing kernel 712 require certain data interaction during their operation. The interacting information includes, but is not limited to: instrument information, centralized control system information, CAN messages, time information, and diagnostic information.

In the preferred embodiment, an RPC (Remote Procedure Call) framework is used for process communication between the first processing kernel 711 and the second processing kernel 712. RPC is a method of requesting services from remote computer programs over a network without the need to keep all communication formats consistent with the underlying network technology. In some embodiments, one or more processes on the first processing kernel 711 may call a process on the second processing kernel 712. The calling process on the first processing kernel 711 is suspended, while the called process on the second processing kernel 712 begins execution. When the called value is returned to the first processing kernel 711, then the first processing kernel 711 process continues to execute, and vice versa. The caller can pass requests for information to the called party by using parameters, and then obtain the requested information through the returned results. Use of an RPC framework for process communication between the first processing kernel 711 and the second processing kernel 712 can prevent the first processing kernel 711 and the second processing kernel 712 from seizing resources and can better coordinate processes between the first processing kernel 711 and the second processing kernel 712.

As one example, the user can set language options (English, French, Spanish, Chinese, etc.) on the second operating system of the second processing kernel 712. This language selection information is synchronously transmitted to the first operating system on the first processing kernel 711 through a communication protocol, achieving synchronous updates of the system language and further transmitting text images in the desired language to the display screen 72.

If desired, the image transmission between the first processing kernel 711 and the second processing kernel 712 can be achieved not only through memory sharing, but also through IO virtualization.

The graphics refresh rate of the first processing kernel 711 and the graphics refresh rate of the second processing kernel 712 may be set according to the display requirements of the driving device. The graphics refresh rate of the first processing kernel 711 is greater than or equal to the graphics refresh rate of the second processing kernel 712. For instance, the preferred graphics refresh rate of the first processing kernel 711 is 60 fps, and the graphics refresh rate of the second processing kernel 712 may be either 60 fps or 30 fps. The graphics refresh rate of the first processing kernel 711 refers to the graphics refresh rate of the first operating system. Similarly, the graphics refresh rate of the second processing kernel 712 refers to the graphics refresh rate of the second operating system.

The centralized control system 70 can provide users with richer and more convenient usage applications and human-machine interaction methods based on the above electronic architecture of control unit 71. The centralized control system 70 can provide various entertainment applications including at least navigation applications, multi-media applications, driver assistance applications, voice control applications, and interconnection network applications, and the like. The multi-media applications include but are not limited to radio playback, playback of audio or video files stored in internal or external memory devices, and game play. Many such specific entertainment applications already exist and are not further described herein. External memory devices for audio or video playback include, for example, a USB flash drive plugged into the vehicle 100, a mobile terminal 200 wirelessly connected to the vehicle 100, and the like. Correspondingly, the vehicle 100 has a socket 65 for USB flash drive insertion as called out in FIG. 2, which may be located on the manipulation system 60, for example. Mobile terminal 200 may include a mobile phone 201 and/or a wearable device 202.

For some entertainment applications and in some embodiments, the control unit 71 controls the display screen 72 to pause providing video file playback images and to pause game images to users while the vehicle 100 is moving in order to ensure driving safety. For instance, the video file playback function and game-playing function may be disabled for users during the running of the vehicle 100. The video file playback function and the game-playing function are allowed for users when the vehicle 100 is not running. As another alternative embodiment, sound from the video file playback function and game-playing function are allowed for users while the vehicle 100 is running, but the corresponding images are not displayed on display screen 72.

The preferred centralized control system 70 also supports auxiliary driving functions. For example, the centralized control system 70 is capable of receiving images from the camera component 81 mounted on the frame 10 and controlling the display screen 72 to display the camera images under control of the control unit 71. In another embodiment, the centralized control system 70 is further capable of receiving radar data from a radar component 82 mounted on the frame 10, and controlling the display screen 72 to send an alarm to the user under control of the control unit 71. The alarm may be in the form of images and/or sounds. In one embodiment, the centralized control system 70 is capable of fusing the received camera images and radar data, and is capable of controlling the display screen 72 to play the fused information to the user under control of the control unit 71.

The centralized control system 70 is preferably capable of directly receiving audio information (such as voice commands) or receiving such audio information through external devices such as wearable device 202. The control unit 71 is capable of recognizing speech locally or through a cloud server 300 to generate corresponding control command instructions.

The centralized control system 70 is preferably interconnectable with one or more mobile terminals 200, such as a mobile phone 201, a wearable device 202 (such as a helmet with an integral headset), and the like. The interconnection methods between the centralized control system 70 and the mobile terminal(s) 200 include but are not limited to Bluetooth connections. In the case of a mobile phone 201, the centralized control system 70 is capable of performing data interaction with the mobile phone 201 and projecting the content displayed on the mobile phone 201 onto the display screen. In addition, some applications supported on one or multiple mobile terminal(s) 200 can be mapped to the display screen 72, and the display screen 72 can be used as an input device and/or output device to achieve corresponding functions, such as answering or initiating phone calls.

The preferred centralized control system 70 can also provide new user guidance to guide a new user to use the various functions. The control unit 71 controls the display screen 72 to display a new user guidance icon, and when the control command for the new user guidance icon is triggered, the control display screen 72 displays methods of using various functions to the new user.

The preferred centralized control system 70 is further capable of providing a plurality of setting functions for various components of the vehicle 100. The setting functions may include but are not limited to: setting driving mode, setting direction manipulation component temperature, setting seat temperature, setting audio channel, setting display screen brightness, setting sound volume, and the like. While some of the above setting functions may be provided on existing vehicles, they are mainly based on hard buttons located on existing vehicles. Users may only be able to set them one by one through the hard buttons on existing vehicles, which is extremely inconvenient to use and may cause problems of low efficiency response. Some existing hard buttons are used frequently and have a risk of damage and failure. The preferred centralized control system 70 can enable various setting functions on one display interface of the display screen 72, making it convenient to use. In a preferred embodiment, the centralized control system 70 provides setting functions for various components of the vehicle 100 which can be implemented by the second operating system, such as providing setting functions through the Android system, which improves response speed.

Figure 17:
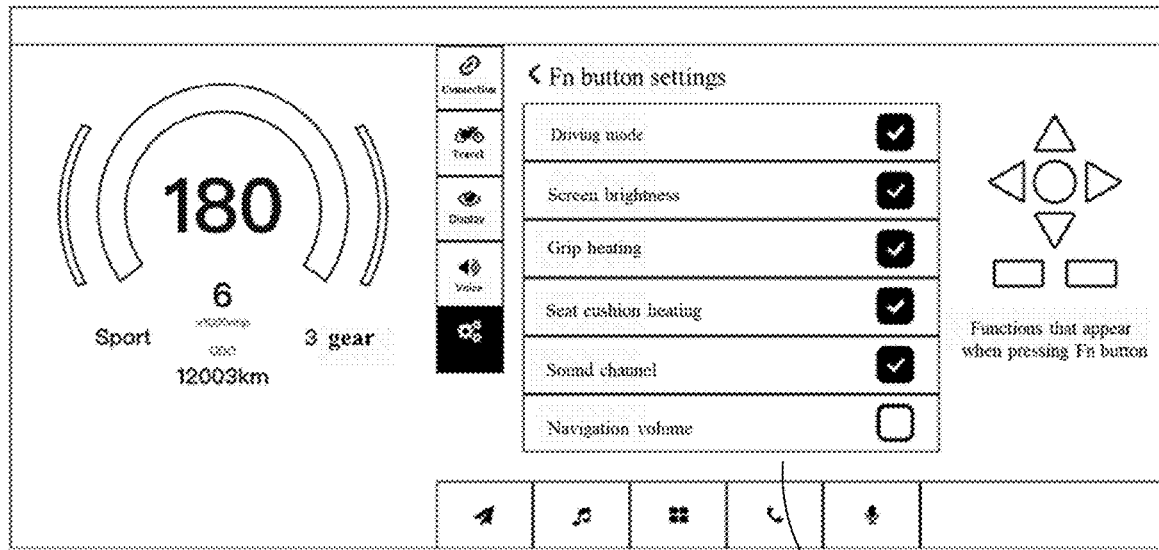
FIG. 17 is a rear view of a display interface for setting Fn button function.

The preferred centralized control system 70 is capable of saving and calling of various setting conditions input by the user. In some embodiments, the control display screen 72 displays a "save" icon, which is used for the user to save the input content for the setting functions. In addition, the display screen 72 displays a "name" icon which is used to indicate whether the user uses a default name to correspond to the input content, or a new name which can be input to correspond to the input content. Such a customized input content name can be set for one function or for a plurality of functions. The control display screen 72 displays images corresponding to the saved input content to the user, such as displaying default or newly named images when receiving instructions from the user to use the settings. Upon receiving the user control command corresponding to the images, a function control command is output, which is used to instruct the corresponding components of the vehicle 100 to complete functional adjustments corresponding to the input instructions. As shown in FIG. 17, the display images corresponding to such settings can be displayed in the display interface of display screen 72 in the form of a floating window 792. In the preferred embodiment, the images corresponding to such settings are displayed in the second-mode entertainment display area 728 in the second (entertainment-focused) display mode to avoid obstructing the display of instrument images.

The human-machine interaction methods supported by the centralized control system 70 will be described in detail below.

Users can control the centralized control system 70 through touch control for the display screen 72, voice control, and operation of the operation controls 64 in the manipulation system 60.

In some embodiments, control of the centralized control system 70 is achieved through touch control for the display screen 72. The preferred display screen 72 is a touch screen and includes an LCD screen (not separately shown) and a touch cover plate (not separately shown) covering the LCD screen. The touch control for the display screen 72 is achieved by touching the touch cover plate. In some embodiments, the display screen 72 also supports fingerprint recognition, iris recognition, and the like. In such embodiments, the central control system 70 is unlocked through fingerprint recognition or iris recognition. If it is detected that the vehicle 100 is driving during the switching process between the first and second display modes, the touch function of the display screen 72 may be locked or disabled based on the control unit 71 to ensure driving safety. The touch control function of the display screen 72 is enabled based on the control unit 71 and the display screen 72 is returned to a touch controllable state when the vehicle 100 stops driving.

Voice control function can be enabled after the centralized control system 70 is started and is turned off when the centralized control system 70 is turned off. During the activation of the centralized control system 70, if the centralized control system 70 detects that the user is on a phone call, the voice control function is be disabled for the duration of the phone call. In voice control embodiments, the functions that the centralized control system 70 can achieve through touch control on the screen 72 or through operation controls 64 may also be achieved through voice control.

Control of the centralized control system 70 may also be achieved through the operation of the operation controls 64 in the manipulation system 60. A plurality of operation controls, such as buttons, knobs, toggle keys, or the like are arranged in the manipulation system 60 of the vehicle 100. When at least one of the plurality of operation controls is operated, the centralized control system 70 can receive control command and execute corresponding operations based on the control command. The centralized control system 70 supports various functions, some of which are frequently used or needs to respond to the request of user, so the requirement of real-time response is very high. Human-machine interaction with the centralized control system 70 can be conveniently and efficiently achieved by operating the centralized operation controls 64. Therefore, in preferred embodiments of the present invention, the manipulation system is not only used to control the operation of the vehicle 100, but also capable of controlling the operation of the centralized control system 70 by operating the centralized operation controls 64. In some embodiments due to the touch function of the display screen 72 being turned off while driving, user control of the centralized control system 70 may require operating the centralized operation controls 64.

The operations for the centralized operation controls 64 may include a momentary press, a long press, and a continuous press. The momentary press is defined as a first time length press, such as instant press that immediately lifts up after being pressed. The long press is defined as a second time length press that requires holding for a time length, such as 1 second. The continuous compression is defined as a third time length press that requires holding for a longer time length, such as 10 seconds. The third time length is greater than the second time length, and the second time length is greater than the first time length. In addition, the operation of the centralized operation controls 64 may further include pressing two or more buttons simultaneously, rotating, and toggling.

Figure 15:
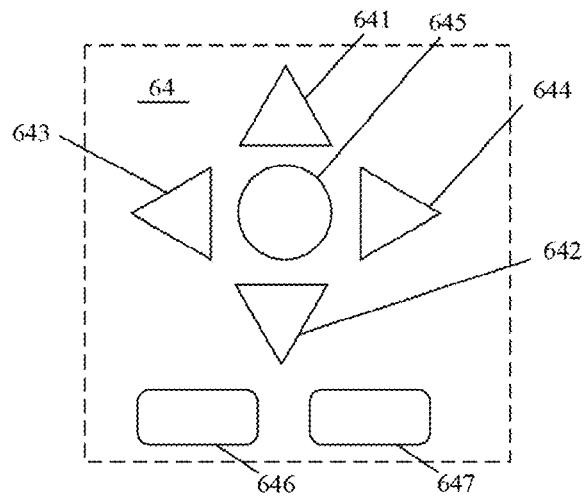
FIG. 15 is a rear view of the preferred operation controls in the embodiment of FIG. 1.

FIG. 15 is a rear view of the structure of some centralized operation controls 64 in a preferred embodiment of the present invention. As shown in the FIG. 15, the centralized operation controls 64 include a first up operation control 641, a second down operation control 642, a third left operation control 643, and a fourth right operation control 644, which may also be referred to as the up button 641, the down button 642, the left button 643, and the right button 644, respectively. All of the four operation controls 641, 642, 643, 644 are three-cornered, with each vertex pointing in a different direction. This allows users to easily determine their functions based on the shape, with the displayed options corresponding to intuitive button use. For example, when different options are displayed vertically, users may switch options and/or provide control commands through pressing the up operation control 641 and/or the down operation control 642, and may adjust the amount of any particular function (such as amount of sound volume) through pressing the left operation control 643 and/or the right operation control 644.

The centralized operation controls 64 preferably also include a fifth operation control 645, a sixth operation control 646, and a seventh operation control 647. The fifth operation control 645 is preferably located in the middle of the directional buttons 641-642, 643-644 and can enable or disable (toggle) voice control, and may be referred to as a voice button. A vehicle voice assistant for achieving voice control of the centralized control system 70 is displayed on the display screen 72 when the user presses the voice button 645. When the centralized control system 70 is connected to the mobile terminal 200, if the voice button 645 is pressed, the mobile terminal 200 will receive audio information.

The sixth operation control 646 is preferably located toward the lower-left and may be referred to as a Function ("Fn") button. The Fn button 646 can call out the negative screen 791 and/or floating window 792, providing convenience for users to quickly view vehicle information and to use settings. In some embodiments, calling out of the negative screen 791 or floating window 792 is achieved through different operations on the Fn button 646. For example, the floating window 792 is called out in response to the centralized control system 70 receiving a control command corresponding to a first time length pressing on the Fn button 646, and the negative screen 791 is called out in response to the centralized control system 70 receiving a control command corresponding to a second time length pressing on the Fn button 646. As an example, the control unit 71 controls the display screen 72 to display the floating window 792 when the Fn button is momentarily pressed, and controls the display screen 72 to display the negative screen 791 when the Fn button 646 is long pressed.

In preferred embodiments, the negative screen 791 and floating window 792 can be called out only in the second (entertainment-focused) display mode. The control unit 71 does not perform any operation when the Fn button 646 is pressed in the first (instrument-focused) display mode. The shape of the Fn button 646 is preferably different from other operation controls 641-645, which is beneficial for users to quickly distinguish between buttons. As examples, the shape of the Fn button 646 may be rectangular, or a rectangle with rounded corners.

In the preferred embodiment, the seventh operation control 647 is a custom button. The customer button 647 has signal transmission functions which correspond to customized settings entered by the user.

The centralized operation control 64 may be located around the direction manipulation component 61 (as shown in FIG. 1) in order to allow the driver to easily press any of the buttons 641-647 while ensuring driving safety. In the case where the direction manipulation component 61 includes handlebars 613, the centralized operation controls 64 may be located around the left grip 611 or around the right grip 612. The distance between the centralized operation controls 64 and the direction manipulation component 61 (left grip 611 or right grip 612) should not exceed 25 centimeters, and more preferably is shorter than 10 centimeters.

Figure 16:
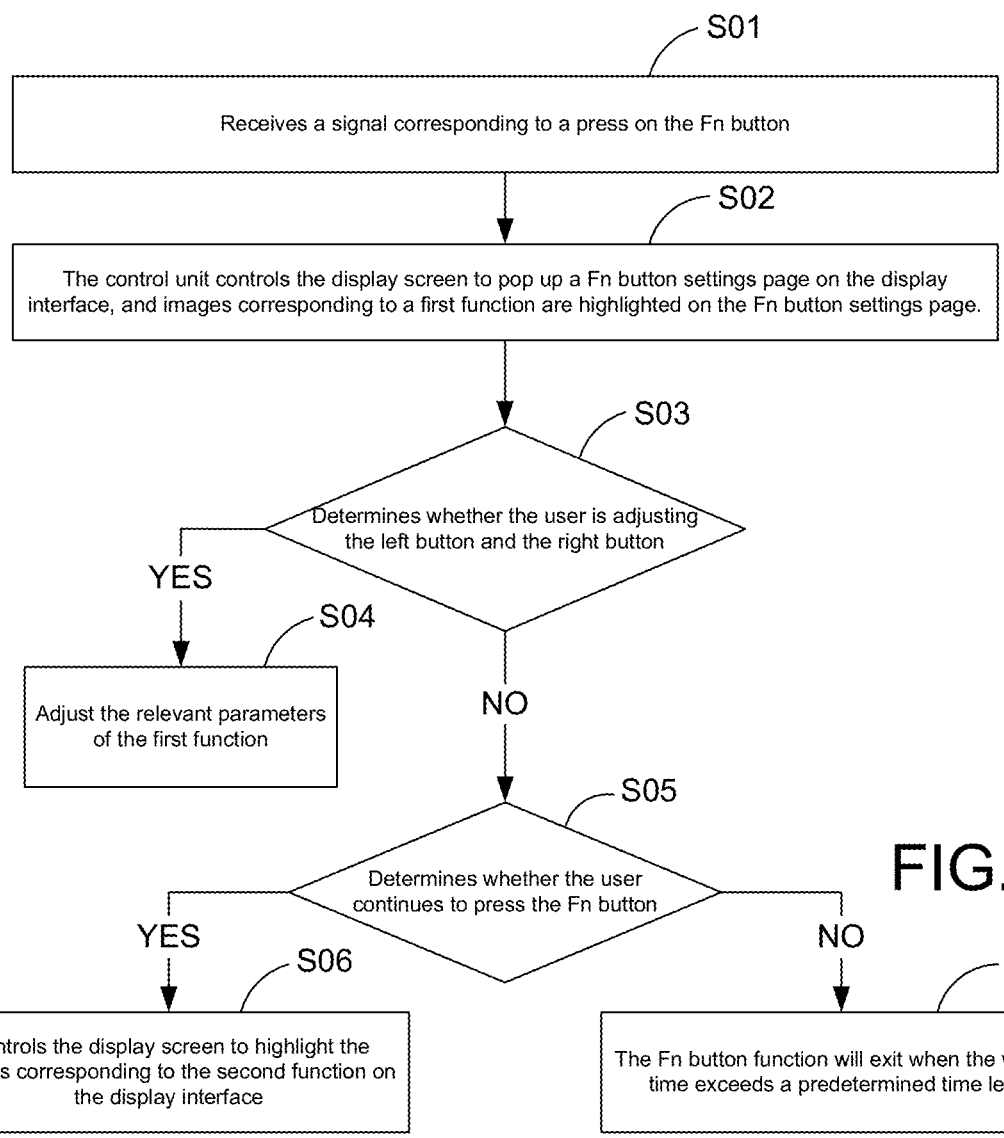
FIG. 16 is a flowchart illustrating a preferred method for operating the centralized operation control in an embodiment of the present invention.

FIG. 16 is a flowchart illustrating a method for operating the centralized operation control 64 in a preferred embodiment of the present invention. As shown in FIG. 16:

in step S01, the centralized operation control 64 receives a signal corresponding to a press on the Fn button and transmits the signal to the control unit 71; and in step S02, the control unit 71 controls the display screen 72 to pop up a Fn button settings page on the display interface, and images corresponding to a first function is highlighted on the Fn button settings page.

A preferred settings page corresponds to the floating window 792 shown in FIG. 17 for setting various components of the vehicle 100. Examples of various functions that can be set include driving mode, screen brightness, grip heating, seat cushion heating, sound channel, and navigation volume. The corresponding option box can have two states: checked or unchecked, which for example can be controlled by momentary presses of the Fn button 6454. Once checked, the amount of each function can be controlled by the left and right buttons 643, 644. Thus, in step S03, the control unit 72 determines whether the user is adjusting the left button 643 and/or the right button 644, such as increasing or decreasing the amount of heating of the grips 611, 612, increasing or decreasing the amount of heating of the seat cushion 50, setting the brightness of the screen 72, and/or setting a navigation sound volume. Thus, in step S04, if the user is adjusting the left button 643 and/or the right button 644, then the control unit 72 adjusts the relevant parameters of the selected function.

In step S05, if the user is not adjusting the left button 643 and/or the right button 644, the control unit 72 determines whether the user continues to press the Fn button 645. In step S06, if the user continues to press the Fn button 645, the control component 71 controls the display screen 72 to highlight the images corresponding to the next function on the display interface, and steps S03-S06 are repeated.

In step S07, if the user no longer presses the Fn button 645 or the left button 643 or the right button 644, the Fn button function will exit when the waiting time exceeds a predetermined time length. The predetermined time length may be for example 3-5 seconds.

In summary, the control unit 71 receives control commands from the user based on pressing of at least some centralized control controls 64 for certain periods of time. The control unit 71 then controls the display screen 72 to display images corresponding to the setting function based on the received control commands, possibly adjusting various features of the vehicle 100 based on the received control commands.

Figure 18:
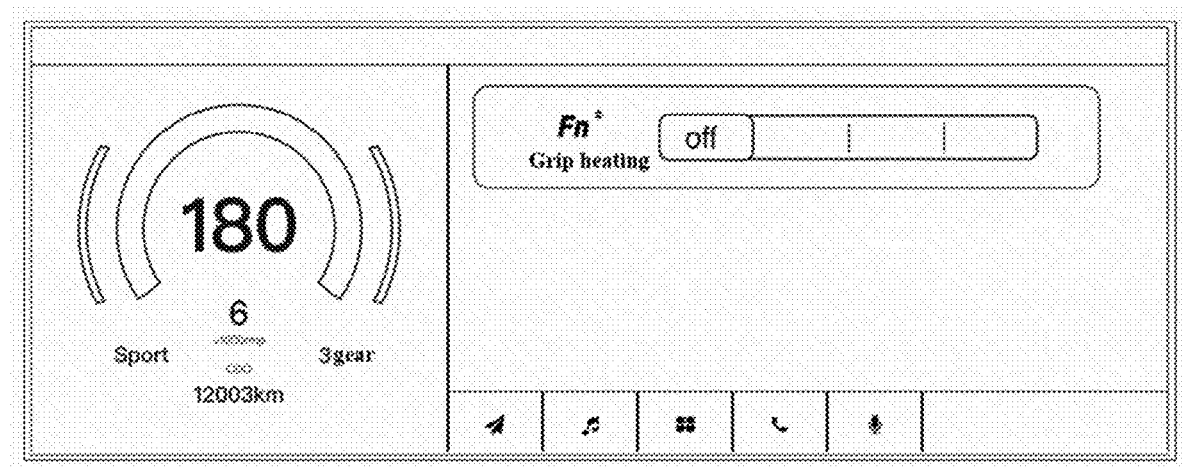
FIG. 18 is a rear view of the display interface for setting the grip heating function.

FIG. 18 is a rear view of the display interface for setting the grip heating function. When the images corresponding to heating of the grips 611, 612 are highlighted, if a signal corresponding to pressing the left and/or right buttons 643, 644 is received, then the control display screen 72 will display this display interface. Under this display interface, the operation of adjusting the left and/or right buttons 643,644 will be displayed in the corresponding images on the display screen 72, changing the amount of grip heating.

Figure 19:
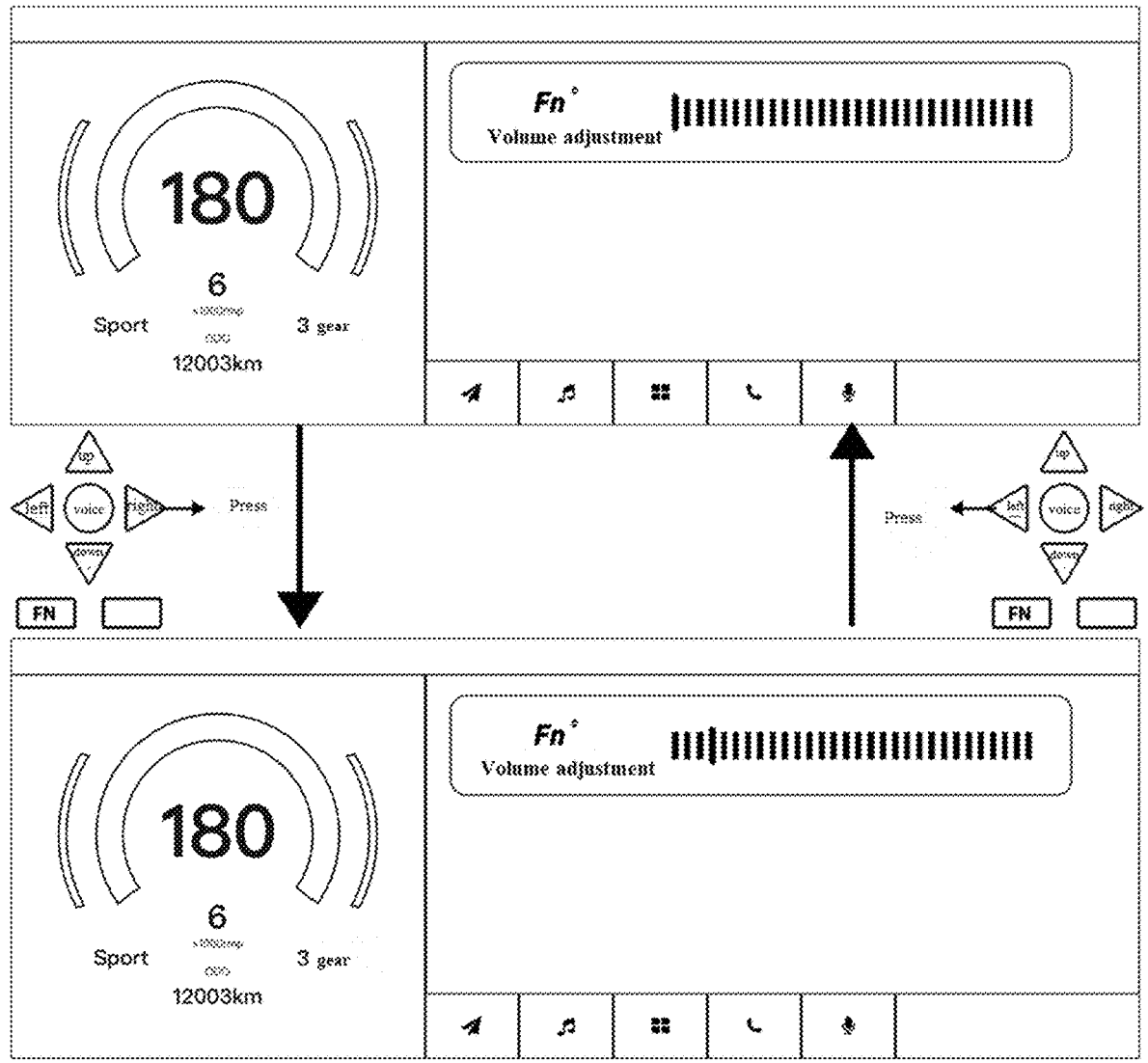
FIG. 19 is a rear view of the display interface for setting the volume adjustment function.

FIG. 19 is a similar rear view of the display interface, this time for adjusting volume. When the images corresponding to volume adjustment are highlighted, if a signal corresponding to pressing the left and/or right buttons 643, 644 is received, then the control display screen 72 will display this display interface. When the right button 644 is pressed, the volume is gradually increased, whereas when the left button 643 is pressed, the volume is gradually turned down.

By adding a centralized operation control 64 to the manipulation system 60 of the vehicle 100, it can be more convenient and efficient to control the centralized control system 70. The driver does not need to touch the display screen 72 during the running of the vehicle 100, thereby ensuring driving safety. The operation controls of the centralized operation control 64 shown in FIG. 15, and the control method and corresponding display interfaces shown in FIGS. 16 to 19, are only for illustrative purposes and should not be construed as limiting the present invention.

The specific embodiments described here are only used to explain this invention, not to limit it. All other embodiments obtained by ordinary technical personnel in this field without engaging in creative labor fall within the scope of protection defined by the attached claims.

The accompanying drawings are only some examples or embodiments of the present application. Ordinary technical personnel in this field can apply the present invention to other similar situations based on these drawings, without the need for creative labor, even if work done in their development process might be complex and/or lengthy. Many design, manufacturing, or production changes made based on the technical content disclosed herein require only routine technical skill, and the brevity of the present specification should not be considered as insufficient disclosure of the content disclosed in this application.

This specification only describes several embodiments of the present invention. The specific and detailed descriptions cannot be understood as limiting the scope of patent protection. Numerous other minor modifications, embodiments and/or improvements can be devised by those skilled in the art which fall within the scope and spirit of the principles of this invention.

The invention claimed is:

1. A vehicle, being a motorcycle or an off-road vehicle, the vehicle comprising a frame;
    a plurality of wheels comprising at least one front wheel and at least one rear wheel;
    a suspension system comprising a front suspension and a rear suspension, the at least one front wheel being connected to the frame through the front suspension, and the at least one rear wheel being connected to the frame through the rear suspension;
    a power system disposed on the frame for providing power to the vehicle, at least one of the front wheel and the rear wheel being connected to the power system in a transmission mode;
    at least one straddle seat disposed on the frame; and
    a manipulation system for manipulating the running of the vehicle;
    wherein the vehicle further comprises:
    a centralized control system comprising a control unit and a display screen, the display screen being disposed adjacent to the manipulation system and in front of the at least one straddle seat, with at least two operating systems in the control unit; the at least two operating systems comprising a first operating system running on a first processing kernel and a second operating system running on a second processing kernel; the control unit being capable of controlling the display screen to display one or a plurality of instrument images and one or a plurality of entertainment images in at least two different and switchable display modes based on the at least two different operating systems; the at least two different and switchable display modes comprising a first (instrument-focused) display mode and a second (entertainment-focused) display mode;
        wherein, in the first (instrument-focused) display mode, the instrument images and the entertainment images displayed on the display screen are both generated under control of the first operating system on the first processing kernel and an area occupied by the instrument images on the display screen is greater than an area occupied by the entertainment images on the display screen; and
        wherein, in the second (entertainment-focused) display mode, at least some of the instrument images and at least some of the entertainment images are generated under control of the first operating system on the first processing kernel and at least another some of the instrument images and at least another some of the entertainment images are generated under control of the second operating system on the second processing kernel and an area occupied by the instrument images on the display screen is less than or equal to an area occupied by the entertainment images on the display screen.

2. The vehicle of claim 1, wherein the manipulation system comprises a direction manipulation component comprising a left grip, a right grip, and handlebars connecting the left grip and the right grip; wherein the display screen and the handlebars both intersect with a longitudinal mid-plane of the vehicle; wherein the display screen is connected to the frame or the front suspension through a connection structure, and the display screen is capable of rotating around the connection structure about a display screen rotation axis which is perpendicular to the display screen; and wherein the display screen is located at one of the following positions: a front side of the handlebars further away from the straddle seat(s), a rear side of the handlebars closer to the straddle seat(s), and a position above the handlebars.

3. The vehicle of claim 1, wherein the vehicle comprises only one display screen;
    wherein the instrument images show vehicle driving information and vehicle status information;
    wherein the entertainment images show one or a plurality of running entertainment applications and/or one or a plurality of entertainment applications supported to be run, wherein at least one entertainment application is selected from the group consisting of: a navigation application, a multi-media application, a driver assistance application, a voice control application, and an interconnection network application.

4. The vehicle of claim 1, wherein a ratio of a diagonal length of the display screen to a distance from a front wheel center to a rear wheel center is in the range from 0.11 to 0.3; wherein the manipulation system comprises a direction manipulation component; and wherein a ratio of the diagonal length of the display screen to a distance between two most distal ends of the direction manipulation component is in the range from 0.19 to 0.52.

5. The vehicle of claim 1, wherein, in the first (instrument-focused) display mode, a ratio of the area occupied by the instrument images on the display screen to the area occupied by the entertainment images on the display screen is in the range from 3 to 20.

6. The vehicle of claim 1, wherein, in the first (instrument-focused) display mode, a display interface of the display screen comprises:
    a first-mode instrument display area for displaying at least some of the instrument images;
    a first-mode entertainment display area for displaying at least some of the entertainment images including one or a plurality of entertainment shortcut icons; and
    a switchable display area for displaying some of the instrument images and/or some of the entertainment images including one or a plurality of simplified entertainment images;
    wherein the control unit is capable of controlling the switchable display area of the display screen to switch from a first display picture to a second display picture when the centralized control system receives a control command.

7. The vehicle of claim 1, wherein the entertainment images displayed on the display screen comprise a number of entertainment shortcut icons in both the first (instrument-focused) display mode and the second (entertainment-focused) display mode; and the number of entertainment shortcut icons displayed in the second (entertainment-focused) display mode is greater than or equal to the number of the entertainment shortcut icons displayed in the first (instrument-focused) display mode.

8. The vehicle of claim 1, wherein, in the second (entertainment-focused) display mode, the control unit is further used to control the display screen such that a display interface of the display screen comprises a second-mode instrument display area and a second-mode entertainment display area, and a negative screen and/or a floating window are displayable in the second entertainment display area.

9. The vehicle of claim 1, wherein the control unit is capable of controlling the display screen to switch from the first (instrument-focused) display mode to the second (entertainment-focused) display mode upon at least one of the following three conditions:
when the centralized control system is activated and the second operating system automatically starts running and provides a first predetermined command to the control unit;
when the control unit detects a control command for an entertainment shortcut icon in a display interface of the display screen in the first (instrument-focused) display mode; or
when the control unit detects a first display mode switching command.

10. The vehicle of claim 1, wherein the control unit is capable of controlling the display screen to switch from the second (entertainment-focused) display mode to the first (instrument-focused) display mode upon at least one of the following three conditions:
when an application running in the second operating system ends;
when the control unit receives a second predetermined command; or
when the control unit detects a second display mode switching command.

11. A vehicle, being a motorcycle or an off-road vehicle, the vehicle comprising:
a frame;
a plurality of wheels comprising at least one front wheel and at least one rear wheel;
a suspension system comprising a front suspension and a rear suspension, the at least one front wheel being connected to the frame through the front suspension, and the at least one rear wheel being connected to the frame through the rear suspension;
a power system disposed on the frame for providing power to the vehicle, at least one of the front wheel and the rear wheel being connected to the power system in a transmission mode;
at least one straddle seat arranged on the frame, the at least one straddle seat comprising at least one driver seat;
a manipulation system for manipulating the running of the vehicle;
wherein the vehicle further comprises:
a centralized control system comprising a control unit and a display screen, the control unit being capable of controlling the display screen to display one or a plurality of instrument images and one or a plurality of entertainment images in at least two different and switchable display modes; the at least two different and switchable display modes comprising a first (instrument-focused) display mode and a second (entertainment-focused) display mode;
wherein, in the first (instrument-focused) display mode, an area occupied by the instrument images on the display screen is greater than an area occupied by the entertainment images on the display screen;
wherein, in the second (entertainment-focused) display mode, an area occupied by the instrument images on the display screen is less than or equal to an area occupied by the entertainment images on the display screen; and
wherein the display screen is connected to the frame or the front suspension through a connection structure, and the display screen is capable of rotating around the connection structure about a display screen rotation axis which is perpendicular to the display screen.

12. The vehicle of claim 11,
wherein the centralized control system is capable of receiving camera images from a camera component mounted on the frame, and is capable of controlling the display screen to display the camera images under control of the control unit;
wherein the centralized control system is capable of receiving radar data from a radar component mounted on the frame, and is capable of controlling the display screen to send an alarm to the user under control of the control unit; and
wherein the centralized control system is capable of fusing the received camera images and the received radar data, and is capable of controlling the display screen to display the fused information to the user under control of the control unit.

13. The vehicle of claim 11, wherein the centralized control system is capable of receiving spoken audio information; and the control unit is capable of recognizing the received spoken audio information locally or through a cloud server and generating a corresponding control command.

14. The vehicle of claim 11, wherein the centralized control system is capable of interconnecting with a mobile terminal, and the mobile terminal comprises a mobile phone or a wearable device; wherein the centralized control system is capable of realizing data exchange with the mobile terminal and projecting content from the mobile terminal onto the display screen.

15. The vehicle of claim 11,
wherein, when the display screen is rotated in the first (instrument-focused) display mode, a first-mode adjustment is made to the display interface of the display screen under control of the control unit switching at least two portions of instrument images between a left-right arrangement and an upper-lower arrangement;
wherein, when the display screen is rotated in the second (entertainment-focused) display mode, a second-mode adjustment is made to the display interface of the display screen under control of the control unit switching at least some of the instrument images and at least some of the entertainment images between a left-right arrangement and an upper-lower arrangement.

16. The vehicle of claim 11, wherein the instrument images displayed on the display screen in the second (entertainment-focused) display mode are the same as some of the instrument images displayed on the display screen in the first (instrument-focused) display mode.

17. The vehicle of claim 11, wherein the display interface of the display screen comprises a status display area in the first (instrument-focused) display mode and/or the second (entertainment-focused) display mode, the status display area being used to display a plurality of instrument images that represent vehicle status information, as well as to display a plurality of entertainment application status icons, the plurality of entertainment application status icons being used to remind the user of the current status of the entertainment application that the centralized control system provides.

18. The vehicle of claim 11, wherein the centralized control system is capable of receiving control command from a user through all three of touch control for the display screen, voice control, or an operation on operation controls in the manipulation system.

19. The vehicle of claim 11, wherein the display screen is a touch screen, and a touching function of the touch screen is disabled during running of the vehicle.

20. The vehicle of claim 11, wherein the manipulation system further comprises one or a plurality of centralized operation controls; the centralized control system is capable of receiving control command based on the centralized operation controls, and is capable of executing corresponding operations based on the received control command;
   wherein the centralized operation controls comprise a button, and the button is capable of receiving corresponding control commands based on a first time length press, a second time length press, and a third time length press, the third time length being greater than the second time length, and the second time length being greater than the first time length.

* * * * *